United States Patent
Shamshiri et al.

(10) Patent No.: US 12,243,319 B2
(45) Date of Patent: Mar. 4, 2025

(54) METHODS AND APPARATUS FOR ACQUISITION AND TRACKING, OBJECT CLASSIFICATION AND TERRAIN INFERENCE

(71) Applicant: JAGUAR LAND ROVER LIMITED, Coventry (GB)

(72) Inventors: Navid Shamshiri, Coventry (GB); Arun Raveendran, Coventry (GB); Robin Boyd, Bishops Tachbrook (GB)

(73) Assignee: Jaguar Land Rover Limited, Coventry (GB)

( * ) Notice: Subject to any disclaimer, the term of this patent is extended or adjusted under 35 U.S.C. 154(b) by 762 days.

(21) Appl. No.: 16/977,065

(22) PCT Filed: Jan. 9, 2019

(86) PCT No.: PCT/EP2019/050389
§ 371 (c)(1),
(2) Date: Aug. 31, 2020

(87) PCT Pub. No.: WO2019/166142
PCT Pub. Date: Sep. 6, 2019

(65) Prior Publication Data
US 2021/0012119 A1    Jan. 14, 2021

(30) Foreign Application Priority Data

Mar. 1, 2018 (IN) .............................. 201811007657
Mar. 1, 2018 (IN) .............................. 201811007659
(Continued)

(51) Int. Cl.
*G06V 20/56* (2022.01)
*B60W 10/20* (2006.01)
(Continued)

(52) U.S. Cl.
CPC ............. *G06V 20/56* (2022.01); *B60W 10/20* (2013.01); *B60W 40/068* (2013.01);
(Continued)

(58) Field of Classification Search
CPC ...... G06V 20/56; G06V 20/58; G06V 20/588; G06V 10/764; G06V 10/25; G06V 10/60;
(Continued)

(56) References Cited

U.S. PATENT DOCUMENTS 9,139,204 B1 * 9/2015 Zhao .................... B60W 40/06
2005/0178530 A1   8/2005 Huang et al.
(Continued)

FOREIGN PATENT DOCUMENTS

DE   102005051141 A1   5/2007
DE   102011007608 A1   10/2012
(Continued)

OTHER PUBLICATIONS

Combined Search and Examination Report corresponding to GB Application No. GB1806629.0, dated Oct. 18, 2018, 7 pages.
(Continued)

*Primary Examiner* — Nimesh Patel
(74) *Attorney, Agent, or Firm* — Reising Ethington P.C.

(57) ABSTRACT

A target object tracking system (1) includes a processor (5) for receiving image data (S1) captured by one or more sensor (7) disposed on the vehicle (2). The processor (5) is configured to analyse the image data to identify image components (IMC(n)) and to determine a movement vector (V(n)) of each image component (IMC(n)). The movement vectors each include a magnitude and a direction. At least one of the image components (IMC(n)) is classified as a target image component relating to the target object and at least one of the remaining image components (IMC(n)) as a non-target image component. The movement vector (V(n))

(Continued)

of the at least one target image component is modified in dependence on the movement vector of the or each non-target image component. The target object (3) is tracked in dependence on the modified movement vector of the at least one target image component. The disclosure also relates to a method and a non-transitory computer-readable medium.

9 Claims, 16 Drawing Sheets

(30) Foreign Application Priority Data

| Mar. 1, 2018 | (IN) | ............................ 201811007660 |
|---|---|---|
| Apr. 24, 2018 | (GB) | ...................................... 1806626 |
| Apr. 24, 2018 | (GB) | ...................................... 1806628 |
| Apr. 24, 2018 | (GB) | ...................................... 1806629 |

(51) Int. Cl.
  *B60W 40/068* (2012.01)
  *G06F 18/24* (2023.01)
  *G06V 20/58* (2022.01)

(52) U.S. Cl.
  CPC ........ *G06F 18/24765* (2023.01); *G06V 20/58* (2022.01); *G06V 20/588* (2022.01); *B60W 2420/403* (2013.01); *B60W 2552/05* (2020.02); *B60W 2552/35* (2020.02)

(58) Field of Classification Search
  CPC ...... G06V 20/54; G06V 10/267; G06V 10/82; G06V 10/141; G06V 10/255; G06V 10/443; G06V 10/803; G06V 20/182; G06V 20/40; G06V 20/582; G06V 20/584; G06V 20/625; G06V 20/64; G06V 2201/07; B60W 10/20; B60W 40/068; B60W 2420/403; B60W 2552/05; B60W 2552/35; B60W 2420/42; B60W 40/06; B60W 2720/106; B60W 30/14; B60W 2710/18; B60W 2710/20; B60W 30/12; B60W 30/16; B60W 2554/00; B60W 2556/50; B60W 10/18; B60W 10/184; B60W 2540/18; B60W 2552/15; B60W 2552/20; B60W 2552/30; B60W 2552/40; B60W 2554/80; B60W 2555/20; B60W 30/02; B60W 30/08; B60W 30/09; G06F 18/24765; G06F 18/25; G06F 18/24; G06F 18/2413; G06F 18/241; G06F 18/2411; G06F 18/214; G06F 16/00; G06T 2207/20081; G06T 2207/30248; G06T 7/00; G06T 2207/30256; G06T 7/40; G06T 2207/10021; G06T 2207/20084; G06T 2207/10016; G06T 2207/20132; G06T 2207/10048; G06T 19/003; G06T 2200/08; G06T 7/593; G06T 2200/04; G06T 2207/30252; G06T 2207/30261; G06T 7/174; G05D 1/0246; G05D 2201/0213; G05D 1/0238; G05D 1/0088; G05D 1/0255; G05D 1/0257; G05D 1/0061; G05D 1/0221; G05D 1/0223; G06N 3/045; G06N 3/084; G06N 3/02; G06N 3/08; G06N 5/02; B60R 21/0134; B60R 11/04; B60R 2021/01259; B60R 21/013; B60R 2021/01306; B60R 2021/01311
  See application file for complete search history.

(56) References Cited

U.S. PATENT DOCUMENTS

| 2006/0104481 | A1* | 5/2006 | Demro ................ B60R 21/0134 |
| | | | 701/1 |
| 2011/0077798 | A1* | 3/2011 | Nishizawa ............ B60W 40/06 |
| | | | 701/1 |
| 2013/0057658 | A1* | 3/2013 | Allezard .............. G06V 20/588 |
| | | | 348/47 |
| 2013/0116972 | A1* | 5/2013 | Hanatsuka ............. G01B 17/08 |
| | | | 702/167 |
| 2015/0120153 | A1* | 4/2015 | Heim ...................... G06V 20/58 |
| | | | 382/103 |
| 2015/0353095 | A1 | 12/2015 | Freess |
| 2016/0059851 | A1* | 3/2016 | Klier ....................... B60K 31/00 |
| | | | 701/1 |
| 2016/0379065 | A1* | 12/2016 | Hartmann ............... B60R 11/04 |
| | | | 348/148 |
| 2017/0083794 | A1* | 3/2017 | Nallapa ............... G06F 18/2413 |
| 2017/0151850 | A1 | 6/2017 | Deigmöller et al. |
| 2017/0197630 | A1 | 7/2017 | Mohamed |
| 2017/0243370 | A1* | 8/2017 | Hoye ......................... G06T 7/73 |
| 2017/0370732 | A1 | 12/2017 | Bender et al. |
| 2018/0057003 | A1 | 3/2018 | Hyun |
| 2018/0194286 | A1* | 7/2018 | Stein ..................... B60W 10/04 |

FOREIGN PATENT DOCUMENTS

| DE | 102012022367 A1 | 5/2014 |
| EP | 3312029 A1 | 4/2018 |
| GB | 2552024 A | 1/2018 |
| JP | 2005178530 A | 7/2005 |
| JP | 2007317018 A | 12/2007 |
| RO | 132761 A2 | 8/2018 |
| WO | WO2011124719 A1 | 10/2011 |
| WO | WO2018141340 A1 | 8/2018 |

OTHER PUBLICATIONS

Combined Search and Examination Report corresponding to GB Application No. GB1806628.2, dated Oct. 17, 2018, 5 pages.
Combined Search and Examination Report corresponding to GB Application No. GB 1806626.6, dated Oct. 8, 2018, 6 pages.
International Search Report corresponding to International Application No. PCT/EP2019/050389, Jun. 26, 2019, 4 pages.
Written Opinion corresponding to International Application No. PCT/EP2019/050389, Jun. 26, 2019, 10 pages.

* cited by examiner

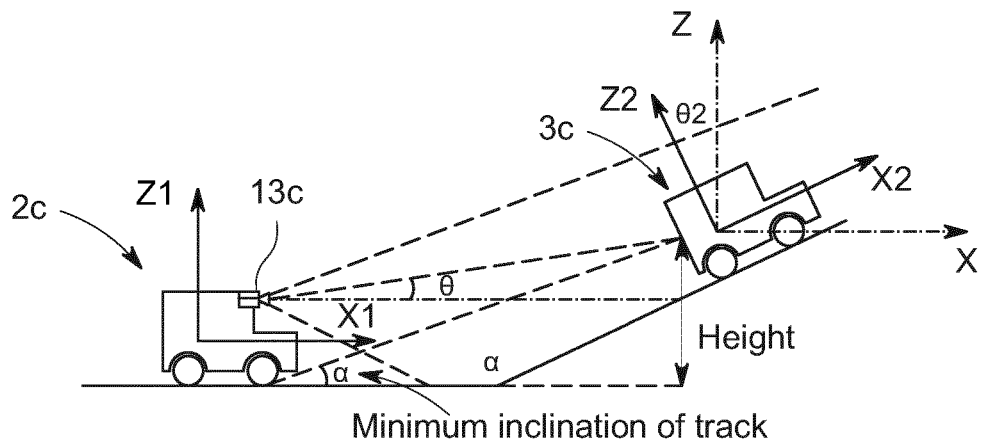
FIG. 6ci
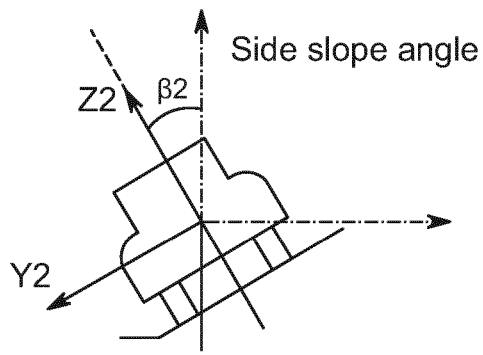
FIG. 6cii
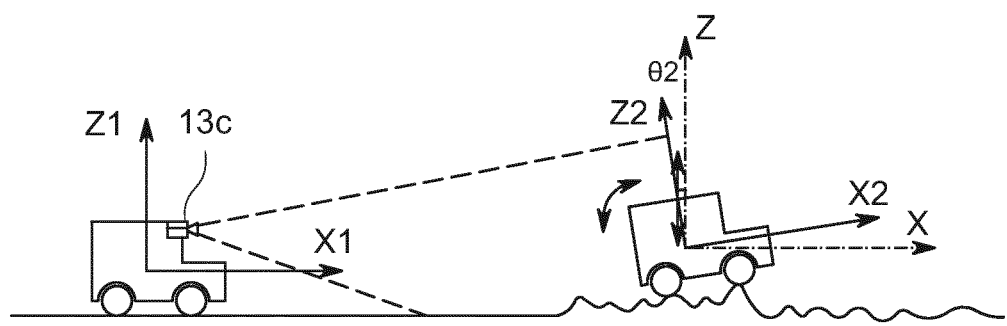
FIG. 6ciii

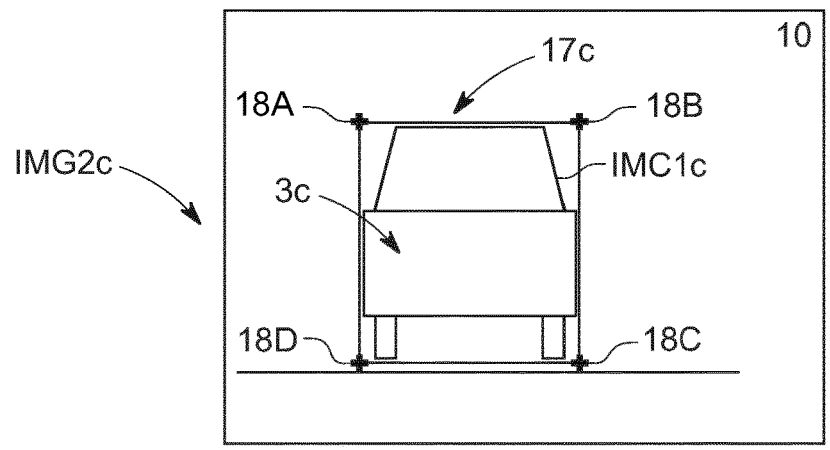
FIG. 7ci
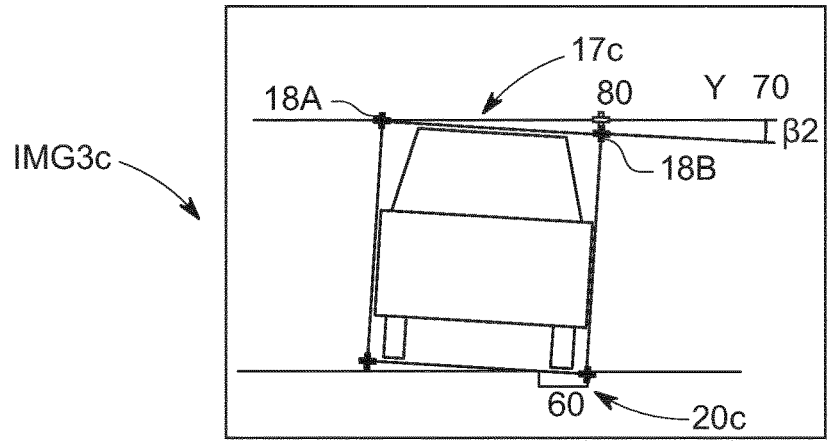
FIG. 7cii
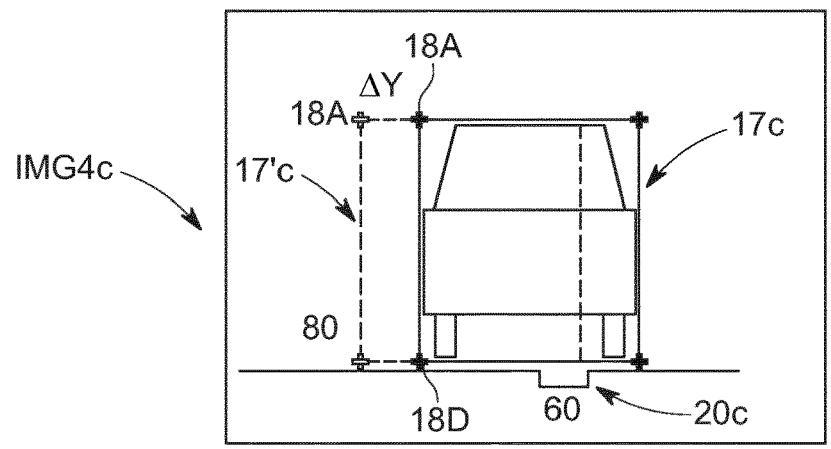
FIG. 7ciii

METHODS AND APPARATUS FOR ACQUISITION AND TRACKING, OBJECT CLASSIFICATION AND TERRAIN INFERENCE

RELATED APPLICATIONS

This application claims priority from United Kingdom patent applications nos. GB1806626.6, GB1806628.2 and GB1806629.0 filed 24 Apr. 2018, the entire contents of each of which are expressly incorporated by reference herein.

TECHNICAL FIELD

The present disclosure relates to methods and apparatus for acquisition and tracking, object classification and terrain inference. Aspects and embodiments of the disclosure have particular application in a vehicle, such as an automobile.

BACKGROUND

It is known to provide a host vehicle with an object detection system for detecting an obstacle or a target vehicle proximal to the host vehicle. Known object detection systems are often used to offer a feature to assist in cruise or traffic jam situations to maintain a distance to the target vehicle, typically the vehicle in front. The object detection systems are usually optimised for road type conditions, where it is possible to make number of assumptions with relative certainty. For example, it may be assumed that the host vehicle and the target vehicle are both travelling on a predominantly continuous surface and, accordingly, that the position of the target vehicle will change in a progressive manner between frames of the image data. However, these assumptions cannot be made when operating in an off-road environment where the host vehicle and/or the target vehicle may experience sharp displacements in any direction (due to surface irregularities, for example). Due to the different operating conditions, the assumptions relied on for known object detection systems are no longer valid. In such cases it can become difficult for a system to establish a valid target and extract it from the surrounding environment.

At least in certain embodiments, the present invention seeks to provide an improved tracking and acquisition apparatus and method.

It is also known to provide a host vehicle with an object classification system for detecting and classifying an object, such as a target vehicle, proximal to the host vehicle. Known object classification systems are also often used to offer a feature to assist in cruise or traffic jam situations to maintain a distance to the target vehicle, typically the vehicle in front. Known object classification systems are usually optimised for road type conditions, where it is possible to make number of assumptions with relative certainty. For example, it may be assumed that the host vehicle and the target vehicle are both travelling on a predominantly continuous surface and, accordingly, that the position of the target vehicle will change in a progressive manner between frames of the image data. Furthermore, when the host vehicle is travelling along a road, it is reasonable to assume a predominantly flat surface in which target vehicles will appear within a tight horizon envelope, relative to the host vehicle. These assumptions can be used to weight object classification, with an aim to reduce false positives and incorrect object classification. However, when traversing terrain in an off-road scenario, both the host vehicle and the host vehicle may change elevation, relative angle or other parameters relatively quickly given the low speed of operation. Accordingly, the assumptions applicable for on-road systems cannot reliably be made. This results in many valid targets not being detected or being incorrectly classified.

At least in certain embodiments, the present invention seeks to provide an improved tracking and acquisition apparatus and method.

When driving a vehicle off-road, it can be advantageous to have advance knowledge of the terrain ahead. Examples of information which would be useful may include track obstacles (holes, ruts, rough surfaces, side slopes, wades) or track direction (bends, slopes). Detecting these features is usually very difficult, until the vehicle is traversing them, often resulting in reactive systems to deal with them after the event.

At least in certain embodiments, the present invention seeks to implement an apparatus and method for inferring at least one terrain characteristic.

SUMMARY OF THE INVENTION

Aspects of the present invention relate to a controller; a system; an apparatus; a method; a non-transitory computer-readable medium; and a vehicle as claimed in the appended claims.

In an embodiment, a target object tracking system for a vehicle comprises:
a processor for receiving image data captured by one or more sensors disposed on the vehicle, wherein the processor is configured to:
analyse the image data to identify image components;
determine a movement vector of each image component, the movement vectors each comprising a magnitude and a direction;
classify at least one of the image components as a target image component relating to the target object and at least one of the remaining image components as a non-target image component;
modify the movement vector of the at least one target image component in dependence on the movement vector of the or each non-target image component; and
track the target object in dependence on the modified movement vector of the at least one target image component.

The non-target image component may correspond to a static or stationary feature. The target object tracking system may modify the movement vector of the at least one target image component in dependence on the movement vectors of the non-target image components. At least in certain embodiments, this modification may at least partially correct for changes in the position and/or orientation of the sensing means, for example as a result of movements of the vehicle. Applying this correction to any potential target image components may improve the object detection system, for example over a rough surface. The modified movement vector may provide more accurate positioning information of the target object relative to the vehicle.

The processor may be configured to form at least a first set of said non-target image components. The first set may comprise a plurality of said non-target image components identified as having movement vectors in a first direction. The processor may form said first set by comparing the movement vectors of the image components and identifying at least one image component having a first movement vector comprising a first direction and/or a first magnitude. The processor may be configured to compare a rate of change of the movement vectors of the image components. For example, the processor may compare the rate of change of the magnitude and/or the direction of the movement vectors. The processor may be configured to identify at least one image component having a first movement vector comprising a first direction changing at a first rate and/or a first magnitude changing at a first rate. Thus, the first set may be formed of non-target image components having at least substantially the same direction.

The processor may be configured to compare the magnitude of the movement vectors of the non-target image components. The non-target image components in the first set may have substantially the same magnitude. Thus, the first set may be formed of non-target image components having at least substantially the same magnitude.

The processor may be configured to determine a correction factor in dependence on the movement vector of the non-target image components in said first set. Alternatively, or in addition, the processor may be configured to modify the movement vector of the at least one target image component by subtracting the movement vector of the non-target image components in said first set.

The processor may be configured to identify image components which are spatially separated from each other. For example, the processor may be configured to identify image components that are distal from each other within the image.

The image data may be video image data captured by one or more image sensors disposed on the vehicle. The processor may be configured to identify the or each image component as a persistent image component. A persistent image component is an image component which may be identified for a predetermined period of time, for example over successive frames of the video image.

The target object tracking system may be configured to track a moving target object. The target object may be a pedestrian or cyclist, for example. Alternatively, the target object may be a target vehicle. The target vehicle may be a wheeled vehicle, such as an automobile.

In an embodiment a vehicle comprises a target object acquisition system as described herein. The vehicle may comprise sensing means for generating the image data. The sensing means may comprise one or more image sensors, such as a camera. The vehicle may be a wheeled vehicle, such as an automobile.

In an embodiment a method of tracking a target object from a vehicle in dependence on image data captured by one or more sensors disposed on the vehicle comprises:
   analysing the image data to identify image components;
   determining a movement vector of each image component, the movement vectors each comprising a magnitude and a direction;
   classifying at least one of the image components as a target image component relating to the target object and at least one of the remaining image components as a non-target image component;
   modifying the movement vector of the at least one target image component in dependence on the movement vector of the or each non-target image component; and
   tracking the target object in dependence on the modified movement vector of the at least one target image component.

The non-target image component may correspond to a static or stationary feature. The method may comprise forming at least a first set of said non-target image components. The first set may comprise a plurality of said non-target image components identified as having movement vectors in a first direction. The method may comprise forming said first set by comparing the movement vectors of the image components. The method may comprise identifying at least one image component having a first movement vector comprising a first direction and/or a first magnitude. The method may comprise forming said first set by comparing the rate of change of the movement vectors of the image components. For example, the method may comprise comparing the rate of change of the magnitude and/or the direction of the movement vectors. The method may comprise identifying at least one image component having a first movement vector comprising a first direction changing at a first rate and/or a first magnitude changing at a first rate.

The method may comprise comparing the magnitude of the movement vectors of the non-target image components. The non-target image components in the first set may have substantially the same magnitude.

The method may comprise modifying the movement vector of the at least one target image component by subtracting the movement vector of the non-target image components in said first set.

The method may comprise identifying image components in the image data which are spatially separated from each other.

The image data may be video image data captured by one or more image sensors disposed on the vehicle. The or each image component may be a persistent image component. A persistent image component is an image component which may be identified for a predetermined period of time, for example over successive frames of the video image.

The method may comprise tracking a moving target object. The target object may be a pedestrian or cyclist, for example. Alternatively, the target object may be a target vehicle. The target vehicle may be a wheeled vehicle, such as an automobile.

In an embodiment a non-transitory computer-readable medium has a set of instructions stored therein which, when executed, cause a processor to perform the method(s) described herein.

In an embodiment a target object acquisition system for a vehicle comprises:
   a processor for receiving image data captured by one or more sensors disposed on the vehicle, wherein the processor is configured to:
      analyse the image data to identify image components;
      determine a movement vector of each identified image component, the movement vectors each having a magnitude and a direction;
      form a first set comprising a plurality of said image components having a first movement vector, and classifying the image components in said first set as non-target image components;
      form a second set comprising an image component having a second movement vector, the second movement vector being different from the first movement vector, and classifying the or each image component in said second set as a target image component relating to the target object; and
      acquire the target object in dependence on the target image component in said second set.

The non-target image component may correspond to a static or stationary feature. The first set may comprise a plurality of image components; and the second set may consist of a single image component.

The processor may form said first set by comparing the movement vectors of the image components and identifying at least one image component having a first movement vector comprising a first direction and/or a first magnitude.

The processor may be configured to compare a rate of change of the movement vectors of the image components.

For example, the processor may compare the rate of change of the magnitude and/or the direction of the movement vectors. The processor may be configured to identify at least one image component having a first movement vector comprising a first direction changing at a first rate and/or a first magnitude changing at a first rate.

The processor may form said second set by comparing the movement vectors of the image components and identifying at least one image component having a second movement vector comprising a second direction and/or a second magnitude. The processor may be configured to compare a rate of change of the movement vectors of the image components. For example, the processor may compare the rate of change of the magnitude and/or the direction of the movement vectors. The processor may be configured to identify at least one image component having a second movement vector comprising a second direction changing at a first rate and/or a second magnitude changing at a first rate.

The first direction and the second direction may be different from each other; and/or the first magnitude and the second magnitude may be different from each other.

The image components identified in the image data may be spatially separated from each other. For example, the processor may be configured to identify image components that are distal from each other within the image.

The techniques described herein for correcting the movement vector of the at least one target image component are applicable to the target object acquisition system. The processor may be configured to modify the movement vector of the at least one target image component in dependence on the movement vector of the or each non-target image component.

The image data may be video image data captured by one or more image sensors disposed on the vehicle. The or each image component may be a persistent image component. A persistent image component is an image component which may be identified for a predetermined period of time, for example over successive frames of the video image.

The processor may be configured to acquire a moving target object. The target object may be a pedestrian or cyclist, for example. Alternatively, the target object may be a target vehicle. The target vehicle may be a wheeled vehicle, such as an automobile.

In an embodiment a vehicle comprises a target object tracking system as described herein. The vehicle may comprise sensing means for generating the image data. The sensing means may comprise one or more image sensors, such as a camera. The vehicle may be a wheeled vehicle, such as an automobile.

In an embodiment a method of acquiring a target object from a vehicle in dependence on image data captured by one or more sensors disposed on the vehicle comprises:
 analyzing the image data to identify image components;
 determining a movement vector of each identified image component, the movement vectors each having a magnitude and a direction;
 forming a first set comprising a plurality of said image components having a first movement vector, and classifying the image components in said first set as non-target image components;
 forming a second set comprising an image component having a second movement vector, the second movement vector being different from the first movement vector, and classifying the or each image component in said second set as a target image component relating to the target object; and
 acquire the target object in dependence on the target image component in said second set.

The non-target image component may correspond to a static or stationary feature. The first set may comprise a plurality of image components. The second set may consist of a single image component.

The method may comprise forming said first set by comparing the movement vectors of the image components. The method may comprise identifying at least one image component having a first movement vector comprising a first direction and/or a first magnitude. The method may comprise forming said first set by comparing the rate of change of the movement vectors of the image components. For example, the method may comprise comparing the rate of change of the magnitude and/or the direction of the movement vectors. The method may comprise identifying at least one image component having a first movement vector comprising a first direction changing at a first rate and/or a first magnitude changing at a first rate.

The method may comprise forming said second set by comparing the movement vectors of the image components. The method may comprise identifying at least one image component having a second movement vector comprising a second direction and/or a second magnitude. The method may comprise forming said second set by comparing the rate of change of the movement vectors of the image components. For example, the method may comprise comparing the rate of change of the magnitude and/or the direction of the movement vectors. The method may comprise identifying at least one image component having a second movement vector comprising a second direction changing at a second rate and/or a second magnitude changing at a first rate.

The first direction and the second direction may be different from each other. The first magnitude and the second magnitude may be different from each other.

The method may comprise identifying image components in the image data which are spatially separated from each other.

The method may comprise modifying the movement vector of the at least one target image component in dependence on the movement vector of the or each non-target image component.

The image data may be video image data captured by one or more image sensors disposed on the vehicle. The or each image component is a persistent image component.

In an embodiment an object classification system for a vehicle comprises a controller configured to:
 receive sensor data from at least one sensor; and
 process the sensor data to classify one or more object external to the vehicle;
 wherein the processing of the sensor data is controlled in dependence on a surface roughness coefficient, the surface roughness coefficient being indicative of a roughness of a surface on which the vehicle is travelling. The object classification system is operative to differentiate between different objects. For example, the object classification system may classify an object as an obstacle or a target vehicle.

The processing of the sensor data may comprise applying an object classification algorithm to the sensor data. The object classification algorithm may comprise a pattern matching algorithm. The pattern matching algorithm may determine a correlation between one or more features of the sensor data with one or more predefined patterns. The image processing module may implement a classification algorithm to the image data to classify each of the image components.

The object classification algorithm may apply a dynamic classification filter. The dynamic classification filter may be modified in dependence on said surface roughness coefficient. Alternatively, or in addition, the dynamic classification filter may be modified in dependence on a vehicle speed.

The controller may be configured to receive said surface roughness coefficient.

Alternatively, the controller may be configured to determine said surface roughness coefficient. The surface roughness coefficient may be generated by analysing image data. The surface roughness coefficient may be generated by analysing a signal from at least one inertial sensor, such as an accelerometer or a gyroscope.

The sensor data may comprise image data received from at least one image sensor. The processing of the sensor data may comprise image processing.

According to a further aspect of the present invention there is provided a vehicle comprising an object classification system as described herein.

In an embodiment a method of classifying objects external to a vehicle comprises:
  determining a roughness of a surface on which the vehicle is travelling;
  receiving sensor data from at least one sensor provided on the vehicle; and
  analysing the sensor data to classify one or more object;
  wherein the analysis of the sensor data is modified in dependence on the determined surface roughness.

The method may comprise applying an object classification algorithm to the sensor data. The object classification algorithm may apply at least one classification filter.

The object classification algorithm may apply a dynamic classification filter. The method may comprise modifying the at least one classification filter in dependence on one or more operating parameters.

The dynamic classification filter may be modified in dependence on said surface roughness coefficient.

Alternatively, or in addition, the dynamic classification filter may modified in dependence on a vehicle speed.

The method may comprise receiving the surface roughness coefficient.

Alternatively, the method may comprise determining said surface roughness coefficient. The surface roughness coefficient may be determined by analysing image data. The surface roughness coefficient may be generated by analysing a signal from at least one inertial sensor, such as an accelerometer or a gyroscope.

The method may comprise processing image data received from at least one image sensor.

According to a further aspect of the present invention there is provided a terrain inference system comprising a controller configured to:
  monitor a target vehicle;
  identify an attitude of the target vehicle and/or a movement of the target vehicle; and
  infer at least one terrain characteristic relating to a region of terrain proximal to the target vehicle in dependence on the identified attitude of the target vehicle and/or the identified movement of the target vehicle. The at least one terrain characteristic may be inferred with reference to the attitude and/or movement of the target vehicle. Thus, the at least one terrain characteristic may be determined indirectly with reference to the behaviour of the target vehicle. At least in certain embodiments, the terrain inference system may apply an inverse dynamics model to infer the at least one terrain characteristic in dependence on the determined behaviour of the target vehicle.

The target vehicle may be in front of the host vehicle. The target vehicle may, for example, be the vehicle in front of the host vehicle in a convoy or may be a lead vehicle in a convoy. The host vehicle may be a following vehicle (i.e. a vehicle which is following the target vehicle). At least in certain embodiments, the host vehicle and the target vehicle are both land vehicles. The host vehicle and the target vehicle may be wheeled vehicles.

In a vehicle follow situation, data can be obtained relating to the target vehicle. It is possible to detect, for example, target vehicle roll, target vehicle inclination relative, or small target deviations resulting from surface conditions. Computation of these parameters can be used to provide a prediction of approaching surface conditions, or to determine a direction or course of the track taken by the target vehicle. The terrain inference system could, for example, be used to implement a pro-active adaptive terrain system that prepares one or more systems in the host vehicle for a rough surface based on the observations made of the target vehicle. Another example may be a warning system to output an alert of a dangerous side slope ahead, for example based on the relative body angle of the target vehicle.

The inferred terrain characteristic may comprise at least one of the following set: an incline angle, an incline direction, a surface roughness, and a terrain composition. The incline angle may correspond to a gradient of the terrain on which the target vehicle is traversing. The surface roughness may provide an indication of the prevailing surface conditions, for example the magnitude and frequency of surface irregularities. The terrain composition may provide an indication of whether the terrain comprises solid/stable surface or an amorphous/unstable surface. The terrain composition may be determined, for example, by detecting a vertical displacement between an underside of the vehicle body and the surface of the terrain.

The terrain characteristic may be inferred in dependence on a roll angle and/or a pitch angle and/or a yaw angle of the target vehicle. For example, the incline angle and/or incline direction may be determined in dependence on one or more of the following: the roll angle, the pitch angle, the yaw angle of the target vehicle. Alternatively, or in addition, the terrain characteristic may be inferred in dependence on a rate of change of the roll angle, the pitch angle, the yaw angle of the target vehicle.

The controller may be configured to generate a vehicle control parameter in dependence on the at least one inferred terrain characteristic. The vehicle control parameter comprises at least one of the following set: drivetrain control parameter, a transmission control parameter, a chassis control parameter, and a steering control parameter. The terrain inference system described herein may be installed in a host vehicle. The vehicle control parameter may be generated to control one or more vehicle systems in said host vehicle.

The controller may be configured to output an alert in dependence on the inferred terrain characteristic. The alert may, for example, notify a driver that the terrain is impassable or potentially hazardous. The controller may, for example, determine that an incline angle of the terrain exceeds a predefined incline threshold.

The identification of the attitude of the target vehicle may comprise one or more of the following set: a target vehicle pitch angle, a target vehicle roll angle, and a target vehicle yaw angle.

The identification of the movement of the target vehicle may comprise identifying at least one of the following set: a change in the target vehicle pitch angle, a change in the target vehicle roll angle, and a change in the target vehicle yaw angle.

The identification of the movement of said target vehicle may comprise identifying at least one of the following set: a vertical movement, a transverse movement, and a longitudinal movement.

The identification of the movement of said target vehicle may comprise identifying an extension or a compression of a vehicle suspension.

The controller may be configured to receive image data from at least one image sensor, the controller being configured to process said image data to identify the attitude of the target vehicle and/or the movement of the target vehicle The controller may be configured to determine a geographic position of a target vehicle and to map said at least one terrain characteristic in dependence on the determined geographic position.

According to a further aspect of the present invention there is provided a vehicle comprising a terrain inference system as described herein.

According to a further aspect of the present invention there is provided a method of inferring at least one characteristic of the terrain proximal to a target vehicle, the method comprising:

monitoring a target vehicle;

identifying an attitude of the target vehicle and/or a movement of the target vehicle; and inferring said at least one terrain characteristic proximal to the target vehicle in dependence on the identified attitude and/or the identified movement.

The inferred terrain characteristic may comprise at least one of the following set: an incline angle, an incline direction, a surface roughness, and a terrain composition. The incline angle and/or the incline direction may be determined in dependence on a roll angle and/or a pitch angle and/or a yaw angle of the target vehicle.

The method may comprise generating a vehicle control parameter in dependence on the at least one inferred terrain characteristic. The vehicle control parameter comprises at least one of the following set: drivetrain control parameter, a transmission control parameter, a chassis control parameter, and a steering control parameter. The chassis control parameter may, for example, adjust suspension controls and/or Electronic Stability Program (ESP) functions.

The method may comprise outputting an alert in dependence on the inferred terrain characteristic.

The identification of the attitude of said target vehicle comprises identifying at least one of the following set: a target vehicle pitch angle, a target vehicle roll angle, and a target vehicle yaw angle.

The identification of the movement of said target vehicle may comprise identifying at least one of the following set: a change in the target vehicle pitch angle, a change in the target vehicle roll angle, and a change in the target vehicle yaw angle.

The method may comprise identifying the movement of said target vehicle by identifying at least one of the following set: a vertical movement, a transverse movement, and a longitudinal movement.

The identification of the movement of said target vehicle may comprise identifying an extension or a compression of a vehicle suspension.

The method may comprise receiving image data from at least one image sensor, the method comprising processing said image data to identify the attitude of the target vehicle and/or the movement of the target vehicle The method comprising determining a geographic position of a target vehicle. The at least one terrain characteristic may be mapped in dependence on the determined geographic position.

In an embodiment, a non-transitory computer-readable medium having a set of instructions stored therein which, when executed, cause a processor to perform one or more of the method(s) described herein.

The host vehicle may be a land vehicle. The target vehicle may be a land vehicle. The term "land vehicle" is used herein to refer to a vehicle configured to apply steering and drive (traction) forces against the ground. The vehicle may, for example, be a wheeled vehicle or a tracked vehicle.

The term "location" is used herein to refer to the relative position of an object on the surface of the earth. Unless indicated to the contrary, either explicitly or implied by the context, references herein to the location of an object refer to the geospatial location of that object.

It is to be understood that by the term 'type of terrain' is meant the material comprised by the terrain over which the vehicle is driving such as asphalt, grass, gravel, snow, mud, rock and/or sand. By 'off-road' is meant a surface traditionally classified as off-road, being surfaces other than asphalt, concrete or the like. For example, off-road surfaces may be relatively compliant surfaces such as mud, sand, grass, earth, gravel or the like. Alternatively, or in addition off-road surfaces may be relatively rough, for example stony, rocky, rutted or the like. Accordingly in some arrangements an off-road surface may be classified as a surface that has a relatively high roughness and/or compliance compared with a substantially flat, smooth asphalt or concrete road surface.

Any control unit or controller described herein may suitably comprise a computational device having one or more electronic processors. The system may comprise a single control unit or electronic controller or alternatively different functions of the controller may be embodied in, or hosted in, different control units or controllers. As used herein the term "controller" or "control unit" will be understood to include both a single control unit or controller and a plurality of control units or controllers collectively operating to provide any stated control functionality. To configure a controller or control unit, a suitable set of instructions may be provided which, when executed, cause said control unit or computational device to implement the control techniques specified herein. The set of instructions may suitably be embedded in said one or more electronic processors. Alternatively, the set of instructions may be provided as software saved on one or more memory associated with said controller to be executed on said computational device. The control unit or controller may be implemented in software run on one or more processors. One or more other control unit or controller may be implemented in software run on one or more processors, optionally the same one or more processors as the first controller. Other suitable arrangements may also be used.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the present disclosure will now be described, by way of example only, with reference to the accompanying figures, in which:

FIG. 3a shows a schematic representation of the target acquisition and tracking system incorporated into the following vehicle shown in FIGS. 1a and 2a;

FIG. 6ci illustrates the determination of a minimum inclination angle of a track on which the target vehicle is travelling;

FIG. 6cii illustrates the determination of a roll angle of the target vehicle is travelling;

FIG. 6ciii illustrates the determination of a surface roughness by tracking the movement and/or attitude of the target vehicle;

FIG. 7ci illustrates an image acquired by a camera showing a target vehicle and a bounding box generated by an image processing module;

FIG. 7cii illustrates changes to the image shown in FIG. 7ci resulting from the target vehicle traversing a pothole; and FIG. 7ciii illustrates changes to the image shown in FIG. 7ci resulting from the target vehicle driving around a pothole.

DETAILED DESCRIPTION

A target acquisition and tracking system 1a in accordance with an embodiment of the present disclosure will now be described with reference to accompanying FIGS. 1a-4a.

Figure 1A:
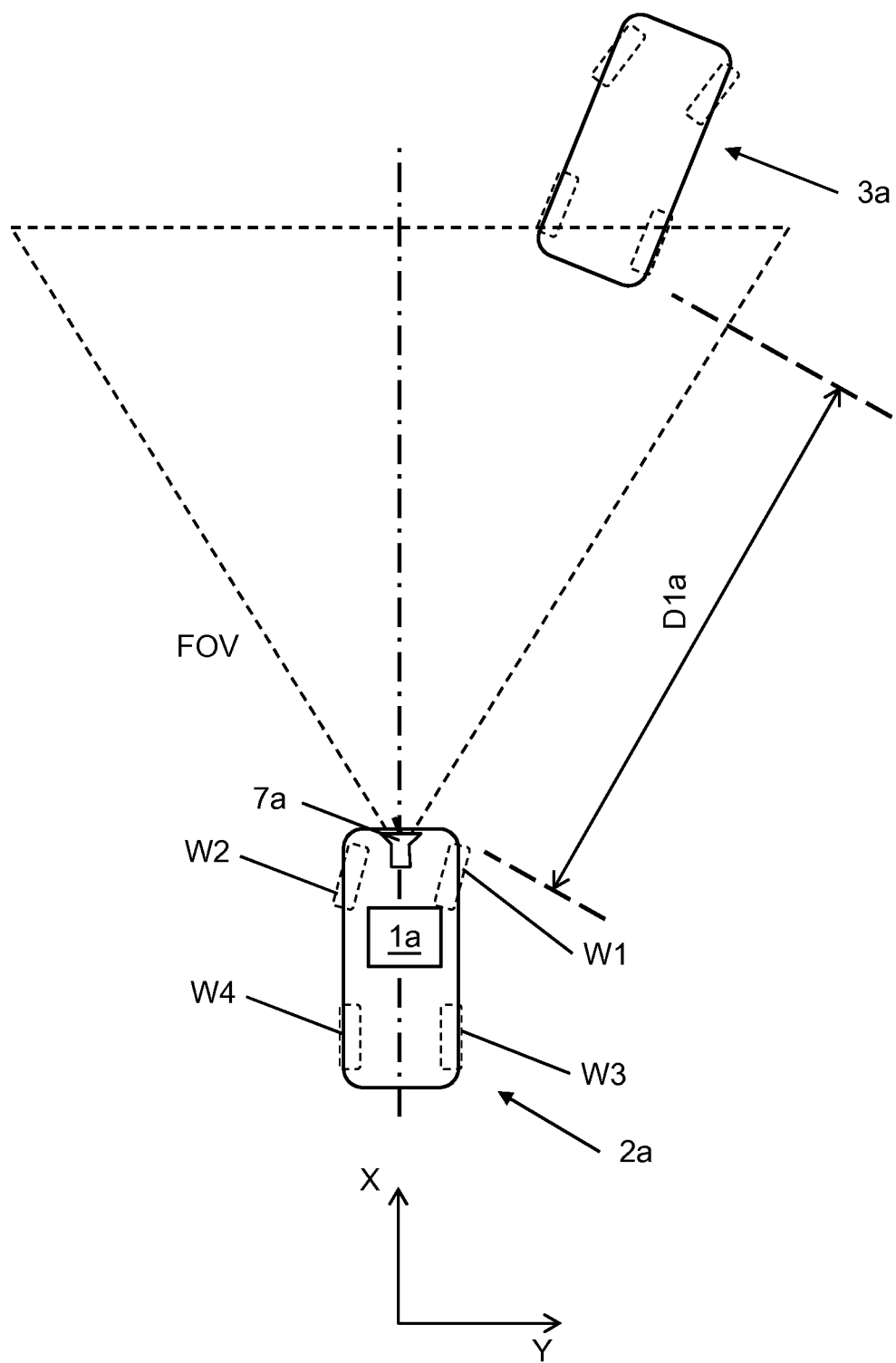
FIG. 1a shows a plan view of a host vehicle incorporating a target acquisition and tracking system in accordance with an embodiment.
Figure 2A:
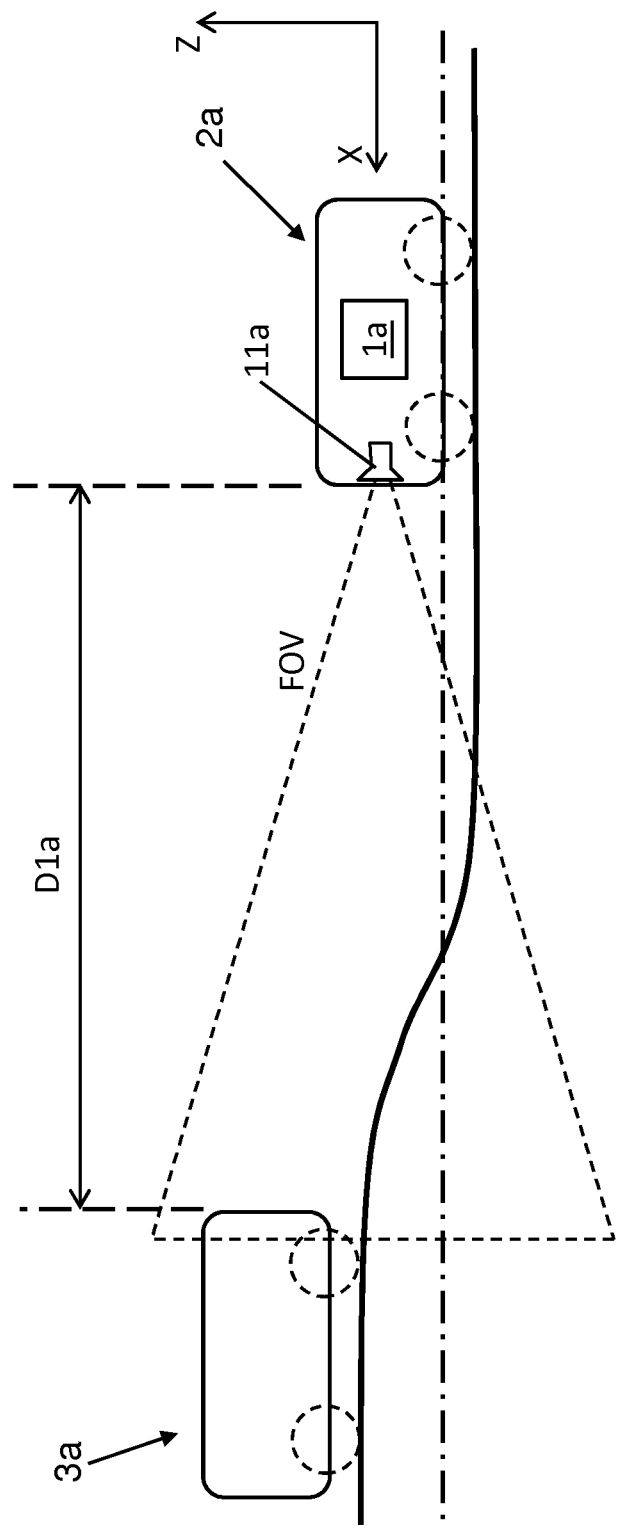
FIG. 2a shows a side elevation of the following vehicle shown in FIG. 1a incorporating the target acquisition and tracking system in accordance with an embodiment.

As illustrated in FIGS. 1a and 2a, the target acquisition and tracking system 1a is installed in a host vehicle 2a. The host vehicle 2a is a wheeled vehicle, such as an automobile or an off-road vehicle. The target acquisition and tracking system 1a is operable to acquire and/or to track a target vehicle 3a which in the present embodiment is another wheeled vehicle, such as an automobile or an off-road vehicle. The target vehicle 3a may, for example, be a vehicle travelling in front of the host vehicle 2a. For example, the target vehicle 3a may be a lead vehicle or a vehicle in front of the host vehicle 2a in a convoy. In this scenario, the host vehicle 2a may be a following vehicle which is travelling along the same route as the target vehicle 3a. The target acquisition and tracking system 1a is described herein with reference to a host vehicle reference frame comprising a longitudinal axis X, a transverse axis Y and a vertical axis Z. In certain embodiments, the target acquisition and tracking system 1a may be operable partially or completely to control the host vehicle 2a particularly, but not exclusively, in an off-road driving scenario.

The host vehicle 2a comprises four wheels W1-W4. A torque is transmitted to the wheels W1-W4 to apply a tractive force to propel the host vehicle 2a. The torque is generated by one or more torque generating machine, such as an internal combustion engine or an electric traction machine, and transmitted to the driven wheels W1-W4 via a vehicle powertrain. The host vehicle 2a in the present embodiment has four-wheel drive and, in use, torque is transmitted selectively to each of said wheels W1-W4. It will be understood that the target acquisition and tracking system 1a could also be installed in a host vehicle 2a having two-wheel drive. The host vehicle 2a in the present embodiment is an automobile having off-road driving capabilities. For example, the host vehicle 2a may be capable of driving on an un-metalled road, such as a dirt road or track. The host vehicle 2a may, for example, be a sports utility vehicle (SUV) or a utility vehicle, but it will be understood that the target acquisition and tracking system 1a may be installed in other types of vehicle. The target acquisition and tracking system 1a may be installed in other types of wheeled vehicles, such as light, medium or heavy trucks. The target vehicle 3a may have the same configuration as the host vehicle 2a or may have a different configuration.

Figure 3A:
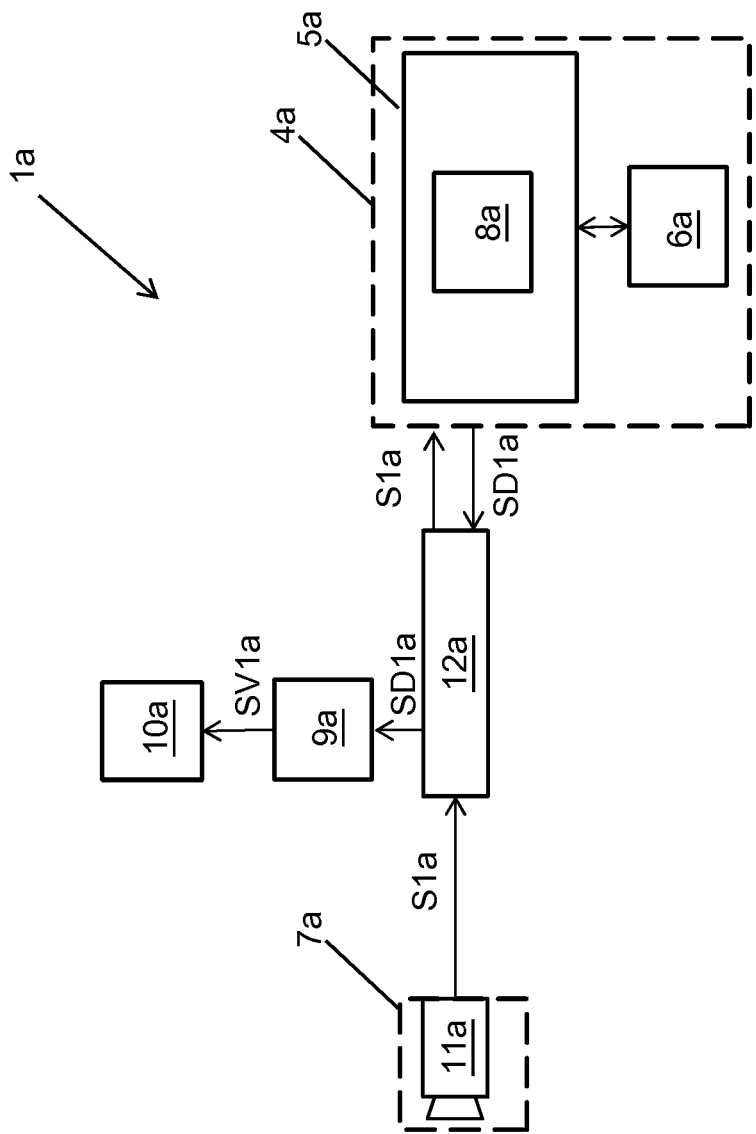

A schematic representation of the target acquisition and tracking system 1a installed in the host vehicle 2a is shown in FIG. 3a. The target acquisition and tracking system 1a comprises a controller 4a having at least one electronic processor 5a and a memory 6a. The processor 5a is operable to receive a data signal S1a from a sensing means 7a. As described herein, the processor 5a is operable to process the image data signal S1a. In the present embodiment, the processor 5a is configured to implement an image processing module 8a to analyse the image data signal S1a to acquire and/or to track the target vehicle 3a. The processor 5a may optionally also control operation of the host vehicle 2a in dependence on the relative location of the target vehicle 3a. For example, the processor 5a may be operable to control a target follow distance D1a between the host vehicle 2a and the target vehicle 3a. The processor 5a may, for example, output a target follow distance signal SD1a to a cruise control module 9a. The cruise control module 9a may be selectively operable in a follow mode suitable for controlling a target speed of the host vehicle 2a to maintain the target follow distance D1a between the host vehicle 2a and the target vehicle 3a. The cruise control module 9a may output a target speed signal SV1a to an engine control module 10a which controls the output torque transmitted to the wheels W1-W4. The cruise control module 9a may also generate a brake control signal for controlling a braking torque applied to said wheels W1-W4. The processor 5a may optionally also output a steering control signal to control an electronic power assisted steering module (not shown) to control a steering angle of the host vehicle 2a.

As illustrated in FIG. 2a, the sensing means 7a is mounted in a forward-facing orientation to establish a detection region in front of the host vehicle 2a. The sensing means 7a comprises at least one optical sensor 11a mounted to the host vehicle 2a. The sensing means 7a may comprise a single camera. Alternatively, the sensing means 7a may comprise a stereoscopic camera. The at least one optical sensor 11a may be mounted at the front of the vehicle, for example incorporated into a front bumper or engine bay grille; or may be mounted within the vehicle cabin, for example in front of a rear-view mirror. The at least one optical sensor 11a has a field of view FOV having a central optical axis VX extending substantially parallel to a longitudinal axis X of the host vehicle 2a. The field of view FOV is generally conical in shape and extends in horizontal and vertical directions. The at least one optical sensor 11a comprises a digital imaging sensor for capturing image data. The image data comprises an image IMG1a corresponding to a scene within the field of view FOV of the at least one optical sensor 11a. The image data is captured substantially in real-time, for example at 30 frames per second. The at least one optical sensor 11a in the present embodiment is operable to detect light in the visible spectrum of light. The sensing means 7a comprises optics (not shown) for directing the incident light onto an imaging sensor, such as a charge-coupled device (CCD), operable to generate image data for transmission in the image data signal S1a. Alternatively, or in addition, the sensing means 7a may be operable to detect light outside of the visible light spectrum, for example in the infra-red range to generate a thermographic image. Alternatively, or in addition, the sensing means 7a may comprise a Lidar sensor for projecting a laser light in front of the host vehicle 2a. Other types of sensor are also contemplated.

The sensing means 7a is connected to the controller 4a over a communication bus 12a provided in the host vehicle 2a. The image data signal S1a is published to the communication bus 12a by the sensing means 7a. In the present embodiment, the connection between the sensing means 7a and the controller 4a comprises a wired connection. In alternative embodiments, the connection between the sensing means 7a and the controller 4a may comprise a wireless connection, for example to enable remote positioning of the sensing means 7a. By way of example, the sensing means 7a may be provided in a remote targeting system, such as a drone vehicle. The processor 5a is operable to read the image data signal S1a from the communication bus 12a. The processor 5a extracts the image data from the image data signal S1a. The image processing module 8a implements an image processing algorithm to acquire the target vehicle 3a within the image data. The operation of the image processing module 8a will now be described in more detail.

The image processing module 8a analyses the image data to identify one or more image components IMC(n) within the image IMG1a. The image components IMC(n) are preferably persistent features within the image IMG1a detectable within the image data for at least a predetermined time period or over a predetermined number of frames, for example two or more successive frames. In certain embodiments, the image components IMC(n) may comprise an identifiable feature or element contained within of the image IMG1a, for example comprising a plurality of pixels which are present in successive frames. Alternatively, or in addition, the image components IMC(n) may comprise an identified shape or pattern within the image data, for example identified using pattern matching techniques. An embodiment in which the image processing module 8a employs pattern matching techniques to identify the image components IMC(n) will now be described.

The image processing module 8a may implement an edge detection algorithm to detect edges within the image data. The image processing algorithm may, for example, be configured to identify points where the image brightness comprises discontinuities, particularly those points arranged into linear or curved line segments which may correspond to an edge. The image processing module 8a may apply a brightness threshold (which may be a predetermined threshold or a dynamic threshold) to identify the edges of the image components IMC(n) within the image IMG1a. The identified edge(s) may be incomplete, for example in regions where image discontinuities are less pronounced. The image processing module 8a may complete the edges, for example utilising a morphological closing technique, to form a closed region. The or each closed region is identified as a discrete image component IMC(n). By repeating this process, the image processing algorithm may identify each image component IMC(n) contained within the image data.

The image processing module 8a is configured to determine if any of the identified image components IMC(n) correspond or potentially correspond to the target vehicle 3a. The image processing module 8a uses pattern matching techniques to determine if any of the discrete image component IMC(n) identified in the image data (partially or completely) match one or more predefined patterns. The predefined patterns may, for example, comprise an object model defined in two-dimensions (2-D) or three-dimensions (3-D). The predefined patterns may be stored in the memory 6a and accessed by the image processing module 8a. Known pattern matching techniques may be used to perform the comparative analysis. The predefined patterns may, for example, correspond to a shape and/or profile of the target vehicle 3a. Optionally, the predefined patterns may define a colour of the target vehicle 3a, for example specified by a user or identified during an initial calibration procedure. The image processing module 8a uses the pattern matching techniques to classify each discrete image component IMC(n) which corresponds to the target vehicle 3a as a target image component. In the exemplary image IMG1a shown in FIG. 4a, a first discrete image component IMC(1a) is identified as the target image component. The image processing module 8a classifies each of the remaining discrete image components IMC(n) (i.e. the discrete image component(s) IMC(n) which do not correspond to the target vehicle 3a or which cannot be identified) as a non-target image component. The non-target image component(s) correspond to a static feature having a fixed geospatial location. In the exemplary image IMG1a shown in FIG. 4a, a second discrete image component IMC(2a) and a third discrete image component IMC(3a) are identified as non-target image components. The image processing module 8a may be operative to characterise the second and third image components IMC(2a), IMC(3a). By way of example, in the image IMG1a shown in FIG. 4a the image processing module 8a may use pattern matching techniques to determine that the second and third image components IMC(2a), IMC(3a) correspond to a tree and a rock respectively. It will be understood that it is not essential that the image processing module 8a characterises the second and third image components IMC(2a), IMC(3a).

The image processing module 8a is configured to track the movements of each of the image components IMC(n) in the image IMG1a. In particular, the image processing module 8a determines a movement vector V(n) for each discrete image component IMC(n). The movement vectors V(n) each comprise a magnitude and a direction. The image processing module 8a may optionally also determine a rate of change of the magnitude and/or the direction of the movement vectors V(n) (representative of linear acceleration and/or rotational acceleration). In accordance with an embodiment, the image processing module 8a applies a correction factor to the movement vector V(n) of the target image component in dependence on the movement vector(s) V(n) of one or more non-target image components. In the present embodiment, the image processing module 8a compares the movement vectors V(n) of a plurality of non-target image components. The image processing module 8a is configured to compare the movement vectors V(n) of a plurality of the non-target image components. If the movement vectors V(n) of multiple non-target image components are identified as having the same direction and/or the same magnitude, the image processing module 8a groups these non-target image components in a first set. As the non-target image components in the first set are determined as having moved in concert or in unison, the image processing module 8a considers these non-target image components as having a fixed geospatial location (i.e. they are a static or stationary feature) and that their movement in the image IMG1a is due to local movement of the optical sensor 11a, for example as a result of movement of the host vehicle 2a. The image processing module 8a applies the movement vector V(n) of the non-target image components as a correction factor to the movement vector V(n) of the target image component to compensate for the movement in the optical sensor 11a. In the present embodiment, the movement vector V(n) of the non-target image component is subtracted from the movement vector V(n) of the target image component IMC(n). Applying this correction to any potential targets image components IMC(n) may improve the object detection system, for example over a rough surface. The target vehicle 3a may be tracked in dependence on the corrected movement vector V(n).

The acquisition of the target vehicle 3a within the image IMG1a enables identification of the location of the target vehicle 3a relative to the host vehicle 2a. By correcting for local movement of the optical sensor 11a, the image processing module 8a may more accurately determine the relative location of the target vehicle 3a. The target acquisition and tracking system 1a may determine the geospatial position of the target vehicle 3a by referencing a known position of the host vehicle 2a, for example by referencing an on-board global positioning system (GPS). The image processing module 8a may track the target vehicle 3a by tracking the target vehicle 3a with respect to time. The target acquisition and tracking system 1a may thereby determine a route or path along which the target vehicle 3a is travelling.

The image processing module 8a may compare the movement vectors V(n) of the non-target image components with the movement vector V(n) of the target image component. The image processing module 8a may form the first set with non-target image components having movement vectors V(n) which are sufficiently different from the movement vector V(n) of the target image component. When comparing said movement vectors V(n), the image processing module 8a may apply one or more of the following set: a magnitude threshold, a rate of change of magnitude threshold, a direction threshold and a rate of change of direction threshold.

The comparison of the movement vectors V(n) of the image components IMC(n) within the image IMG1a may facilitate identification of the target image component. The image processing module 8a may, for example, form a second set comprising image components IMC(n) having movement vectors V(n) which are different from the movement vectors V(n) of the first set. The image components IMC(n) in the second set may be classified as target image component relating to the target vehicle 3a. The image processing module 8a may compare the movement vectors V(n) for each of the image components V(n) to acquire the target image component IMC(n). The image processing module 8a may seek to acquire the target image component IMC(n) by identifying which of the image components IMC(n) have a different movement vector (i.e. a different direction and/or magnitude). The image processing module 8a may form a first set consisting of a plurality of image components IMC(n) each having movement vectors V(n) at least substantially in the same direction and/or having the same magnitude. The image processing module 8a may form a second set consisting of a plurality of image components IMC(n) each having movement vectors V(n) at least substantially in the same direction and/or having the same magnitude. For example, the first set may consist of a plurality of image components IMC(n) each having movement vectors V(n) in a first direction; and the second set may consist of a single image component IMC(n) having a movement vector V(n) in a second direction. If the first and second directions are different from each other, the image processing module 8a may classify the image components IMC(n) in the second set as corresponding to the target vehicle 3a. The image processing module 8a may perform spatial distribution analysis of the image components IMC(n) within the image IMG1a to determine whether the first set or the second set corresponds to the target image component. For example, if the image components IMC(n) in the first set are distributed throughout the image IMG1a or in different regions of the image IMG1a, the second set is more likely to correspond to objects having a fixed geospatial location and the image processing module 8a classifies these image components IMC(n) as non-target image components. Conversely, if the image components IMC(n) in the second set are grouped together, or the second set consists of one image component IMC(n), the second is more likely to correspond to a moving object within the image IMG1a and the image processing module 8a classifies these image components IMC(n) as target image components.

Figure 4A:
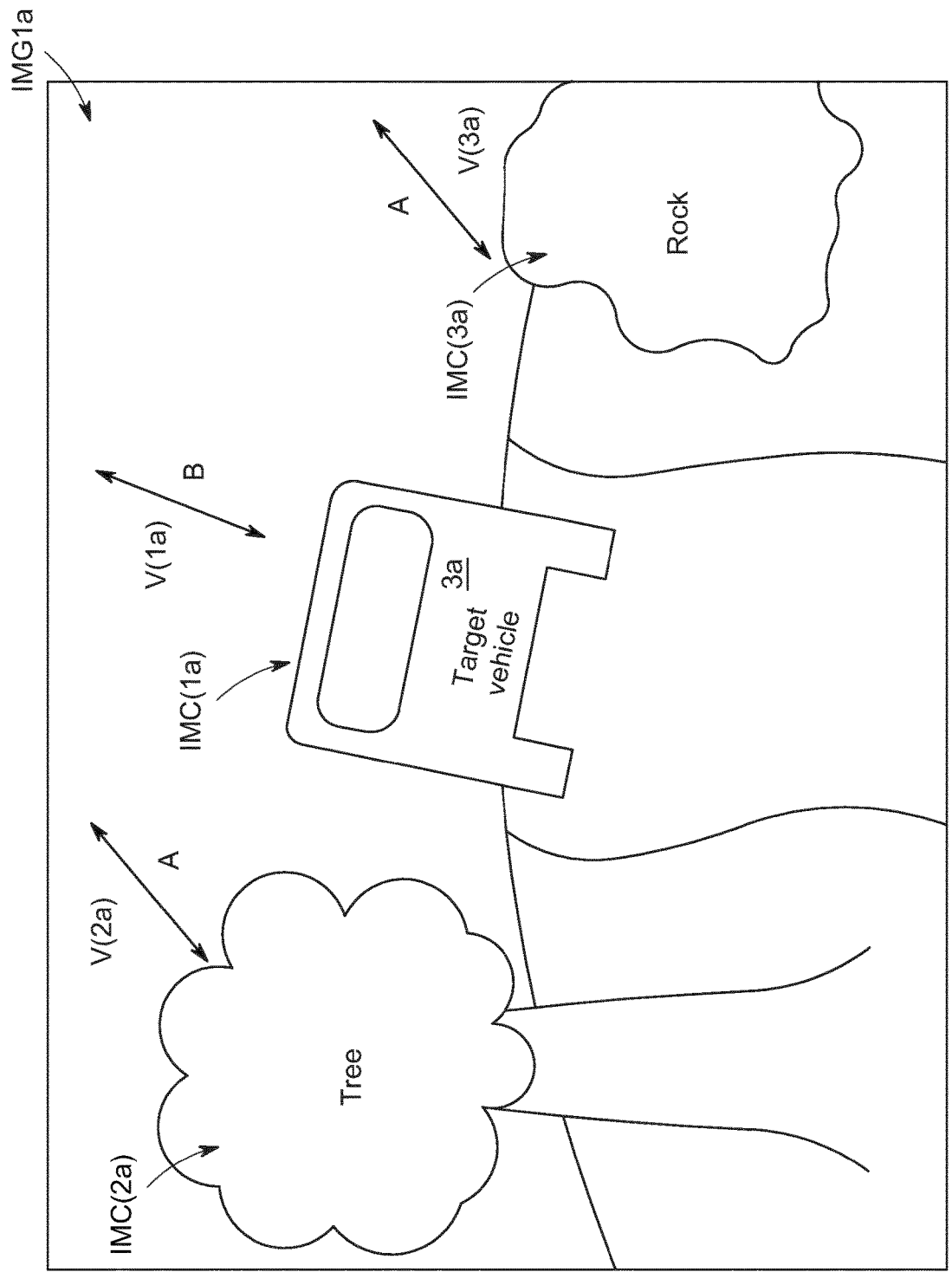
FIG. 4a illustrates the operation of the target acquisition and tracking system to compare the movement vectors of image components identified in an image capture by an optical system on the host vehicle.

The operation of the image processing module 8a will now be described with reference to the exemplary image IMG1a shown in FIG. 4a. The image processing module 8a is operable to analyse the image IMG1a to identify a plurality of the image components IMC(n). The image processing module 8a implements the pattern matching algorithm to identify the image component IMC(n) corresponding to the target vehicle 3a. In the illustrated arrangement, a first image component IMC(1a) is classified as the target image component IMC(n); and second and third image components IMC(2a), IMC(3a) are classified as non-target image components IMC(2a), IMC(3a).

The image processing module 8a determines movement vectors V(n) for each of the image components IMC(n). A first movement vector V(1a) is calculated for the target image component(s) IMC(1a); and second and third movement vectors V(2a), V(3a) are calculated for the non-target image component(s) IMC(2a), IMC(3a). As illustrated in FIG. 4, the first movement vector V(1a) is in a first direction; and the second and third movement vectors V(2a), V(3a) are both in a second direction, the first and second directions being different. In the present case, the second and third movement vectors V(2a), V(3a) are substantially equal to each other. In order to improve the acquisition and/or tracking of the target vehicle 3a, the image processing module 8a subtracts one of the second and third movement vectors V(2a), V(3a) from the first movement vector V(1a). This correction may allow at least partially for movements of the optical sensor 11a on the host vehicle 2a. Thus, the corrected first movement vector V(1a) may provide a more accurate positioning information of the target vehicle 3a relative to the host vehicle 2a.

The target acquisition and tracking system 1a may determine the route taken by the target vehicle 3a and generate a corresponding target route for the host vehicle 2a. At least in certain embodiments, the image processing module 8a may calculate the speed and/or the trajectory of the target vehicle 3a. The calculated speed and/or trajectory at a given location may be defined as a movement vector Vn having a magnitude (representing the target vehicle speed) and direction (representing the trajectory of the target vehicle 3a).

The target acquisition and tracking system 1a has particular application in an off-road environment. When the host vehicle 2a is travelling off-road, the host vehicle 2a may be subject to sudden changes in direction and/or orientation that make the acquisition and tracking of the target vehicle 3a more challenging. The target acquisition and tracking system 1a may be selectively activated when the host vehicle 2a is travelling off-road, for example in response to a user input or automatically when an off-road driving mode is selected.

The target acquisition and tracking system 1a has been described with particular reference to sensing means 7a which is forward facing to enable acquisition and tracking of a target vehicle 3a in front of the host vehicle 2a. It will be understood that the embodiment may be implemented in other configurations, for example comprising sensing means 7a which is side-facing or rear-facing.

The target acquisition and tracking system 1a has been described with particular reference to identifying a single target vehicle 3a. It will be understood that the target acquisition and tracking system 1a may be operable to identify more than one target vehicle, for example to identify a plurality of target vehicles 3a travelling in front of the host vehicle 2a in a convoy.

An object classification system 1b in accordance with an embodiment of the present disclosure will now be described with reference to accompanying FIGS. 1b-5b.

Figure 1B:
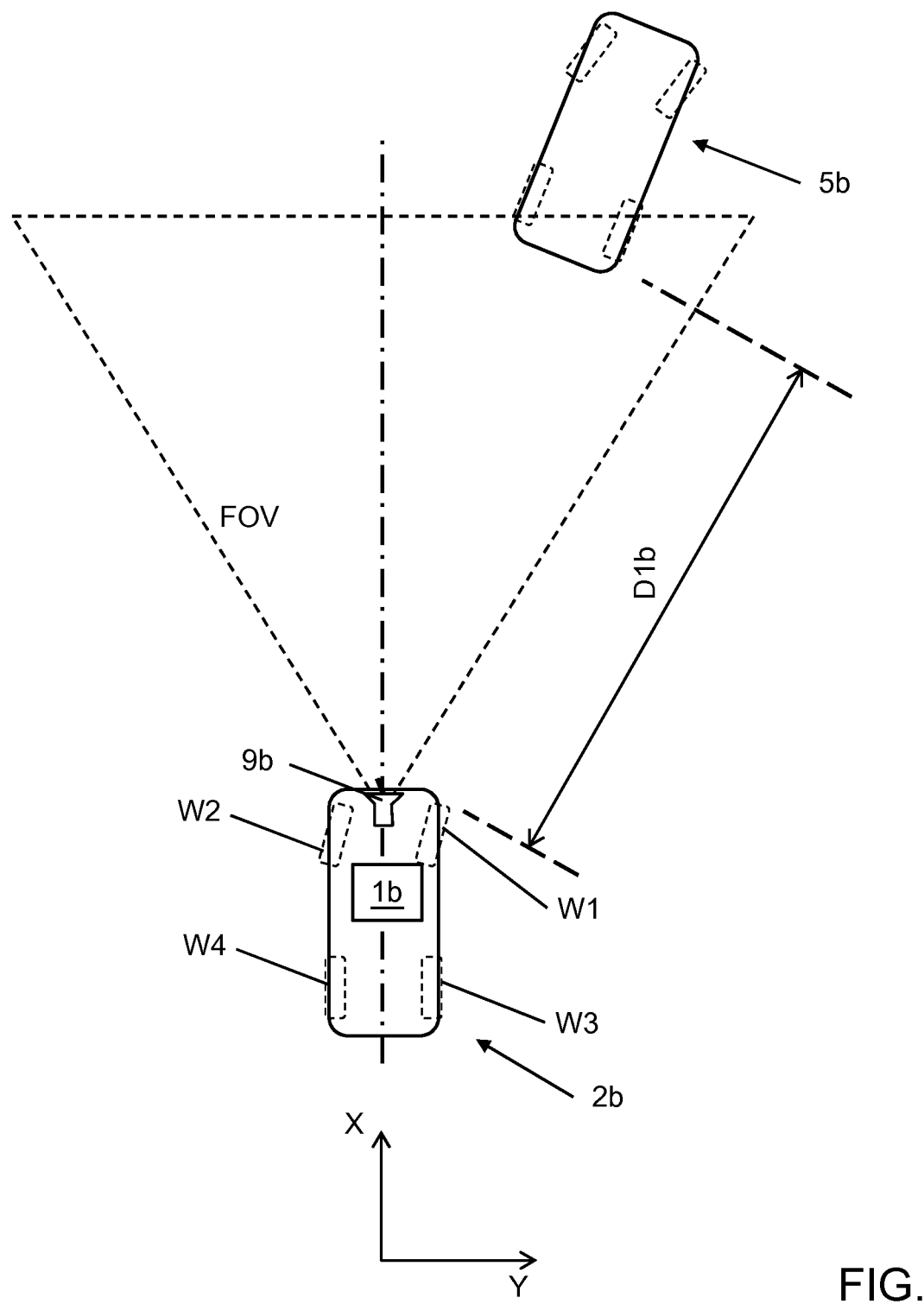
FIG. 1b shows a plan view of a host vehicle incorporating an object classification system in accordance with an embodiment.
Figure 2B:
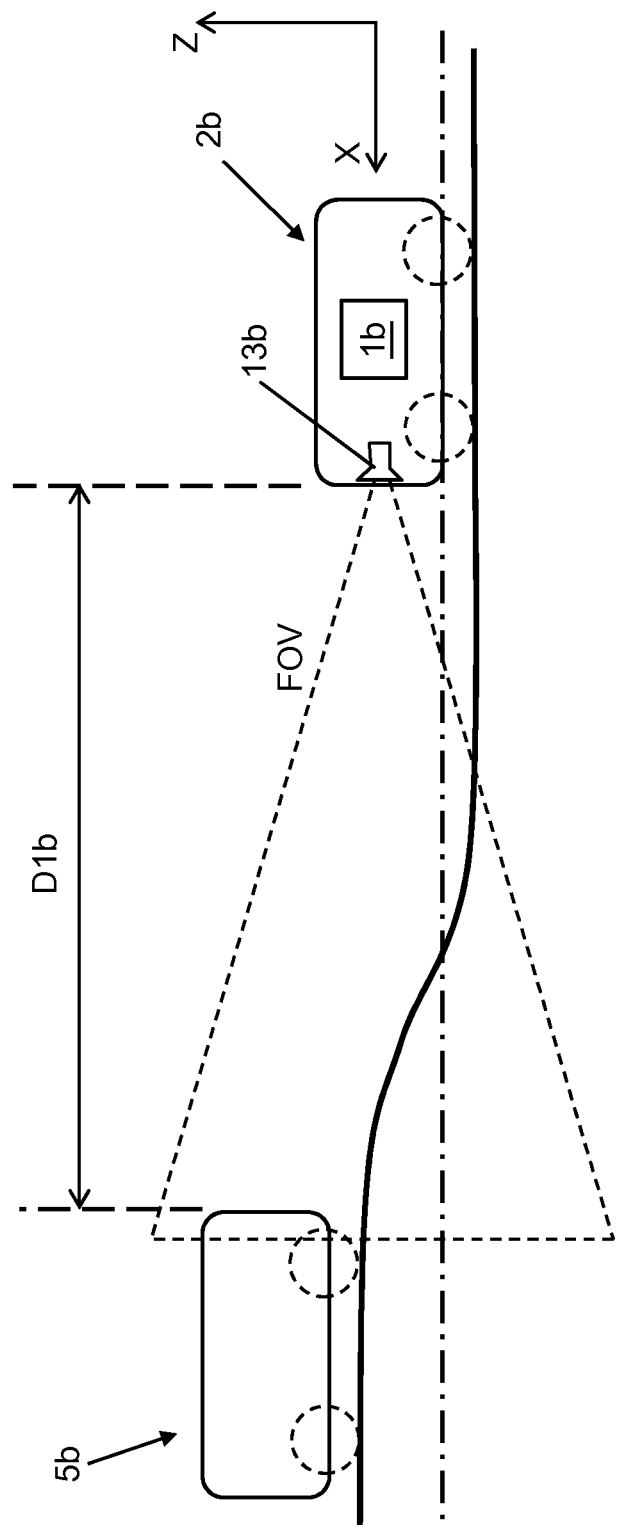
FIG. 2b shows a side elevation of the host vehicle shown in FIG. 1b incorporating an object classification system in accordance with an embodiment.

As illustrated in FIGS. 1b and 2b, the object classification system 1b is installed in a host vehicle 2b. The host vehicle 2b is a wheeled vehicle, such as an automobile or an off-road vehicle. The object classification system 1b is operable to detect and classify an object external to the host vehicle 2b. The object may, for example, be an obstacle or a target vehicle 5b. The target vehicle 5b may, for example, be another wheeled vehicle, such as an automobile or an off-road vehicle. The target vehicle 5b may, for example, be a vehicle travelling in front of the host vehicle 2b. For example, the target vehicle 5b may be a lead vehicle or a vehicle in front of the host vehicle 2b in a convoy. In this scenario, the host vehicle 2b may be a following vehicle which is travelling along the same route as the target vehicle 5b. The object classification system 1b is described herein with reference to a host vehicle reference frame comprising a longitudinal axis X, a transverse axis Y and a vertical axis Z.

The host vehicle 2b comprises four wheels W1-W4. A torque is transmitted to the wheels W1-W4 to apply a tractive force to propel the host vehicle 2b. The torque is generated by one or more torque generating machines, such as an internal combustion engine or an electric traction machine, and transmitted to the driven wheels W1-W4 via a vehicle powertrain. The host vehicle 2b in the present embodiment has four-wheel drive and, in use, torque is transmitted selectively to each of said wheels W1-W4. It will be understood that the object classification system 1b could also be installed in a host vehicle 2b having two-wheel drive. The host vehicle 2b in the present embodiment is an automobile having off-road driving capabilities. For example, the host vehicle 2b may be capable of driving on an un-metalled road, such as a dirt road or track. The host vehicle 2b may, for example, be a sports utility vehicle (SUV) or a utility vehicle, but it will be understood that the object classification system 1b may be installed in other types of vehicle. The object classification system 1b may be installed in other types of wheeled vehicles, such as light, medium or heavy trucks. The target vehicle 5b may have the same configuration as the host vehicle 2b or may have a different configuration.

Figure 3B:
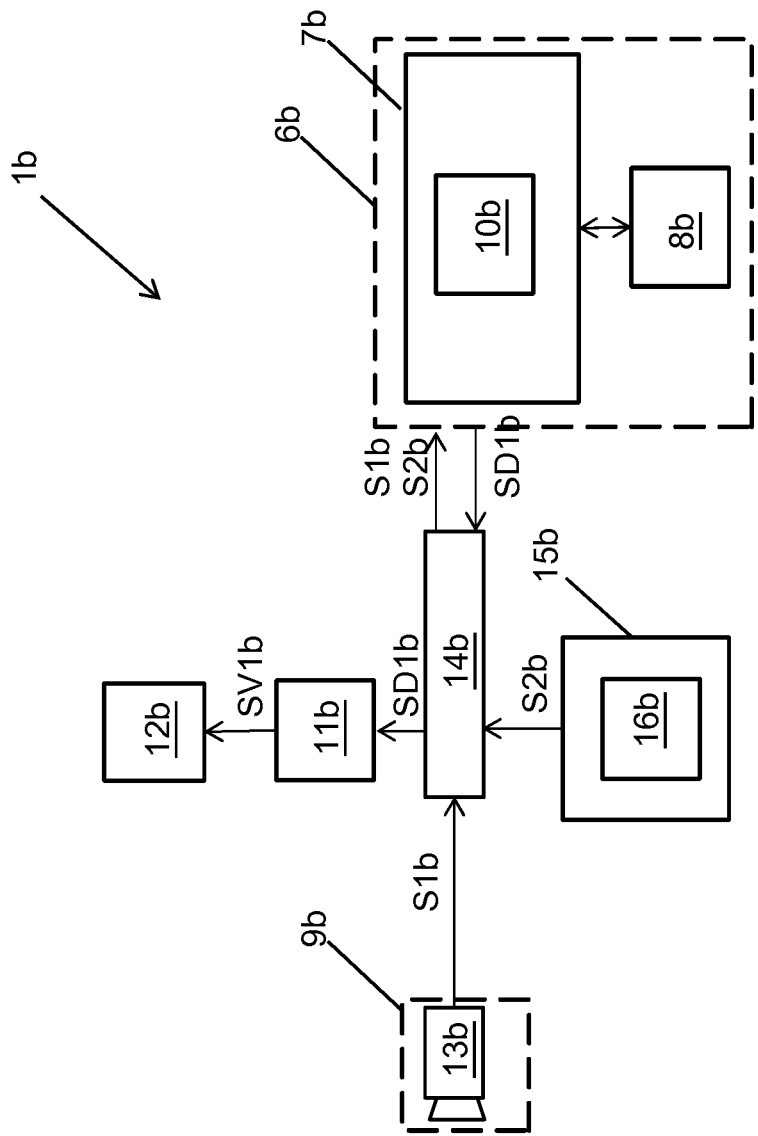
FIG. 3b shows a schematic representation of the object classification system incorporated into the host vehicle shown in FIGS. 1b and 2b.

A schematic representation of the object classification system 1b installed in the host vehicle 2b is shown in FIG. 3b. The object classification system 1b comprises a controller 6b having at least one electronic processor 7b and a memory 8b. The processor 7b is operable to receive a data signal S1b from a sensing means 9b. As described herein, the processor 7b is operable to process the image data signal S1b. In the present embodiment, the processor 7b is configured to implement an image processing module 10b to analyse the image data signal S1b. The image processing module 10b in accordance with an embodiment is configured to detect and classify objects external to the host vehicle 2b. The processor 7b may optionally also control operation of the host vehicle 2b in dependence on the relative location of the target vehicle 5b. For example, the processor 7b may be operable to control a target follow distance D1b between the host vehicle 2b and the target vehicle 5b. The processor 7b may, for example, output a target follow distance signal SD1b to a cruise control module 11b. The cruise control module 11b may be selectively operable in a follow mode suitable for controlling a target speed of the host vehicle 2b to maintain the target follow distance D1b between the host vehicle 2b and the target vehicle 5b. The cruise control module 11b may output a target speed signal SV1b to an engine control module 12b which controls the output torque transmitted to the wheels W1-W4. The cruise control module 11b may also generate a brake control signal for controlling a braking torque applied to said wheels W1-W4. The processor 7b may optionally also output a steering control signal to control an electronic power assisted steering module (not shown) to control a steering angle of the host vehicle 2b.

As illustrated in FIG. 2b, the sensing means 9b is mounted in a forward-facing orientation to establish a detection region in front of the host vehicle 2b. The sensing means 9b in the present embodiment comprises at least one optical sensor 13b mounted to the host vehicle 2b. The sensing means 9b may comprise a single camera. Alternatively, the sensing means 9b may comprise a stereoscopic camera. The at least one optical sensor 13b may be mounted at the front of the vehicle, for example incorporated into a front bumper or engine bay grille; or may be mounted within the vehicle cabin, for example in front of a rear-view mirror. The at least one optical sensor 13b has a field of view FOV having a central optical axis VX extending substantially parallel to the longitudinal axis X of the host vehicle 2b. The field of view FOV is generally conical in shape and extends in horizontal and vertical directions. The at least one optical sensor 13b comprises a digital imaging sensor for capturing image data. The image data comprises an image IMG1b corresponding to a scene within the field of view FOV of the at least one optical sensor 13b. The image data is captured substantially in real-time, for example at 30 frames per second. The at least one optical sensor 13b in the present embodiment is operable to detect light in the visible spectrum of light. The sensing means 9b comprises optics (not shown) for directing the incident light onto an imaging sensor, such as a charge-coupled device (CCD), operable to generate image data for transmission in the image data signal S1b. Alternatively, or in addition, the sensing means 9b may be operable to detect light outside of the visible light spectrum, for example in the infra-red range to generate a thermographic image. Alternatively, or in addition, the sensing means 9b may comprise a Lidar sensor for projecting a laser light in front of the host vehicle 2b. Other types of sensor are also contemplated.

The sensing means 9b is connected to the controller 6b over a communication bus 14b provided in the host vehicle 2b. The image data signal S1b is published to the communication bus 14b by the sensing means 9b. In the present embodiment, the connection between the sensing means 9b and the controller 6b comprises a wired connection. In alternative embodiments, the connection between the sensing means 9b and the controller 6b may comprise a wireless connection, for example to enable remote positioning of the sensing means 9b. By way of example, the sensing means 9b may be provided in a remote targeting system, such as a drone vehicle. The processor 7b is operable to read the image data signal S1b from the communication bus 14b. The processor 7b extracts image data from the image data signal S1b. The image processing module 10b parses the image data to detect and classify image components IMC(n). The operation of the image processing module 10b is described in more detail below.

As shown schematically in FIG. 3b, the object classification system 1b in the present embodiment is configured to receive an inertial measurement signal S2b from an inertial measurement unit (IMU) 15b provided in the host vehicle 2b. The IMU 15b comprises one or more sensors 16b for measuring inertial movement of the host vehicle 2b. The one or more sensors 16b in the present embodiment are configured to measure acceleration of the host vehicle 2b in the longitudinal axis X and the vertical axis Z. The one or more sensors 16b may optionally also measure acceleration of the host vehicle 2b in the transverse axis Y. The one or more sensors 16b may optionally also measure acceleration about one or more of said longitudinal, transverse and vertical axes X, Y, Z. The IMU 15b may determine the orientation of the host vehicle 2b, for example one or more of the following set: vehicle pitch angle, vehicle roll angle and vehicle yaw angle. The one or more sensors 16b may comprise one or more accelerometers (not shown) and/or one or more gyroscopes (not shown). The object classification system 1b analyses said inertial measurement signal S2b to determine a surface roughness coefficient SRC. The surface roughness coefficient SRC provides an indication of the roughness of a surface SF over which the host vehicle 2b is currently travelling. The surface roughness coefficient SRC thereby provides an indication of the magnitude or extent of any irregularities or projections in the surface SF over which the host vehicle 2b is travelling. The surface roughness coefficient SRC may, for example, be determined in dependence on the magnitude of oscillations and/or the frequency with which oscillations are detected. The surface roughness coefficient SRC may be determined in dependence on the period of the oscillations, for example differentiating between short-period oscillations and long-period oscillations. When the host vehicle 2b is travelling over a rough or irregular surface, the orientation of the host vehicle 2b may change due to localised variations in the height of the vehicle under each of the wheels W1-W4. The surface roughness coefficient SRC may be determined in dependence on changes in the orientation of the host vehicle 2b, or the rate of change of the orientation of the host vehicle 2b.

Conventionally, a terrain surface roughness coefficient is calculated by taking the average of three surface roughness index values. The three surface roughness index values are: a roughness index (RI) value RI_1b, providing a measure of roll acceleration, i.e. changes in the angular velocity about the Z-axis; a second RI value RI_2b, providing a measure of pitch acceleration, i.e. changes in the angular velocity of the vehicle about the X-axis; and a third RI value RI_3b, a measure of heave acceleration, i.e. changes in the vertical velocity of the vehicle. In the present embodiment, the object classification system 1b analyses the inertial measurement signal S2b to determine the first, second and third RI values RI_1b, RI_2b, RI_3b. In the present and alternative embodiments the surface roughness coefficient may also be determined as well or instead via the use of a sensor package on the vehicle, such as RADAR or SONAR, to provide surface information for a region of the terrain preceding the vehicle.

Alternatively, or in addition, the surface roughness coefficient SRC may be determined in dependence on processing of the data received from the sensing means 9b. The data may be processed to identify and categorise features contained therein, for example to grade the size and/or frequency of surface irregularities. The data may be processed to detect movements in the at least one optical sensor 13b resulting from movements of the host vehicle 2b. Alternatively, or in addition, the surface roughness coefficient SRC may be determined in dependence on analysis of the behaviour of the vehicle suspension (not shown). For example, the extent and/or frequency of changes in the suspension height may be used to determine the surface roughness coefficient SRC. Alternatively, or in addition, the surface roughness coefficient SRC could be predefined, for example by correlating a current geospatial location of the host vehicle 2b to map data defining the surface roughness coefficient SRC.

Figure 4B:
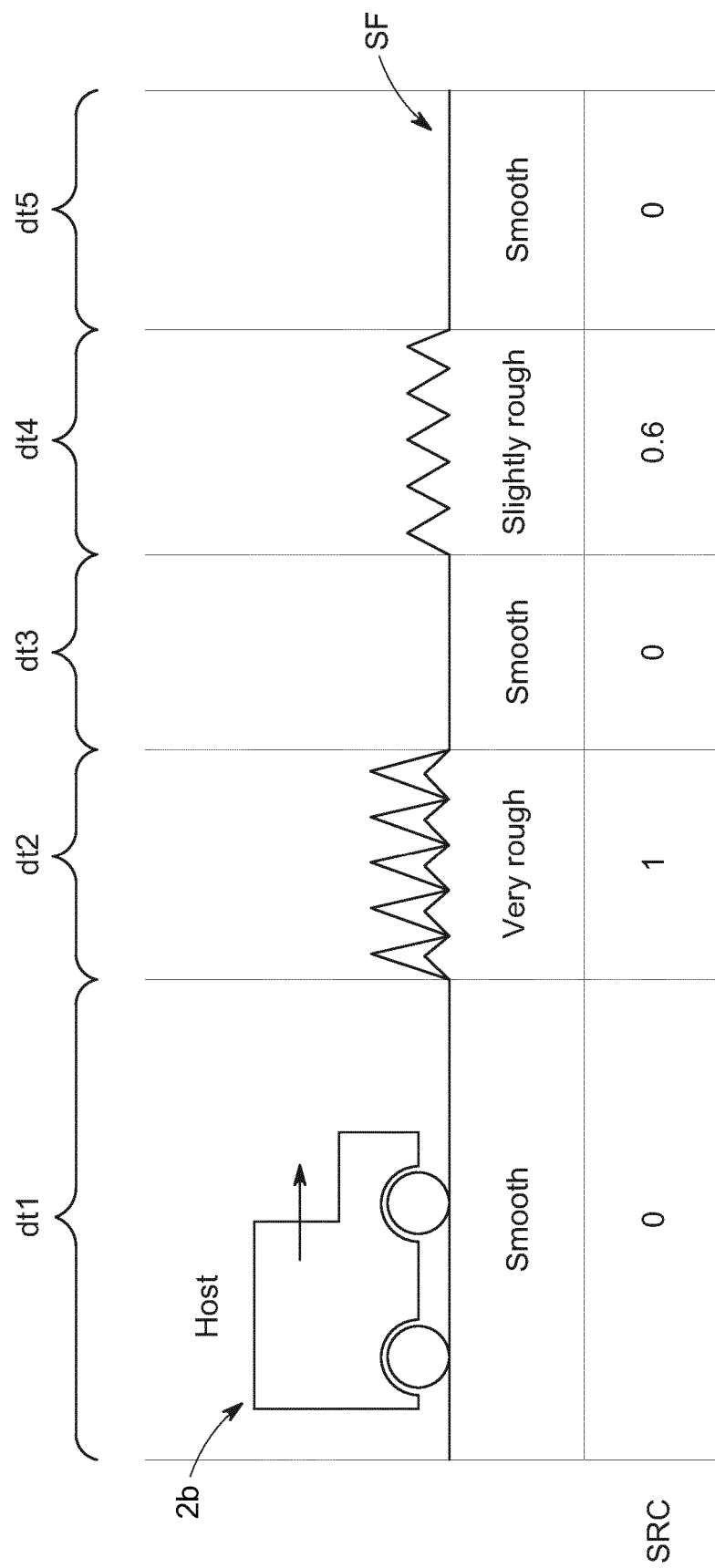
FIG. 4b shows a schematic representation of the determination of the surface roughness coefficient.

In the present embodiment, the surface roughness coefficient SRC is in the range zero (0) to one (1), inclusive. The surface roughness coefficient SRC is set equal to one (1) if the surface SF is deemed to be very rough, for example corresponding to terrain that cannot be traversed by the host vehicle 2b. The surface roughness coefficient SRC is set equal to zero (0) if the surface SF is deemed to be smooth, for example corresponding to a metalled road surface. The surface roughness coefficient SRC may grade the surface roughness between these endpoints. For example, a surface which is slightly rough may have a surface roughness coefficient SRC of 0.8. The surface roughness coefficient SRC in accordance with an embodiment is illustrated in FIG. 4b for different surface roughness's.

The operation of the image processing module 10b will now be described. The image processing module 10b parses the image data from the optical sensor 13b to identify one or more image components IMC(n) within an image IMG1b. The image components IMC(n) are preferably persistent features within the image IMG1b detectable within the image data for at least a predetermined time period or over a predetermined number of frames, for example two or more successive frames. In certain embodiments, the image components IMC(n) may comprise an identifiable feature or element contained within the image IMG1b, for example comprising a plurality of pixels which are present in successive frames. The image processing module 10b implements an edge detection algorithm to detect edges within the image data. The image processing algorithm may, for example, be configured to identify points where the image brightness comprises discontinuities, particularly those points arranged into linear or curved line segments which may correspond to an edge. The image processing module 10b may apply a brightness threshold (which may be a predetermined threshold or a dynamic threshold) to identify the edges of the image components IMC(n) within the image IMG1b. The identified edge(s) may be incomplete, for example in regions where image discontinuities are less pronounced. The image processing module 10b may complete the edges, for example utilising a morphological closing technique, to form a closed region. The or each closed region is identified as a discrete image component IMC(n). By repeating this process, the image processing algorithm may identify each image component IMC(n) contained within the image data.

The image processing module 10b implements a pattern matching algorithm to compare each of the image components IMC(n) identified in the image IMG1b to predefined patterns stored in memory 8b. The image processing module 10b classifies each of the image components IMC(n) in dependence on the correlation between each image component IMC(n) with the predefined patterns. The image processing module 10b may, for example, classify each image component IMC(n) as one of the following set: an obstacle 4b; a target vehicle 5b; a cyclist; a person (not shown); an animal, etc. The image processing module relate may seek to further classify the objects 3b, for example to differentiate between different types of obstacles 4b. With reference to the exemplary image IMG1b shown in FIG. 5b, the image processing module 10b classifies the image components IMC(n) as a first obstacle 4-1b, a second obstacle 4-2b and a target vehicle 5b. The image processing module 10b could be configured to use the techniques described herein to classify the first obstacle 4-1b as a tree; and the second obstacle 4-2b as a boulder. The image processing module 10b may be unable to classify some of the image components IMC(n) and these may remain unclassified.

The pattern matching algorithm is implemented to determine if any of the image component IMC(n) identified in the image data (partially or completely) match one or more predefined patterns. The predefined patterns may, for example, comprise an object model defined in two-dimensions (2-D) or three-dimensions (3-D). The predefined patterns may be stored in the memory 8b and accessed by the image processing module 10b. The predefined patterns may, for example, correspond to a shape and/or profile of one or more predefined obstacles 4b and/or target vehicles 7b. Optionally, the predefined patterns may define a colour of the target vehicle 5b, for example specified by a user or identified during an initial calibration procedure. Known pattern matching techniques may be used to determine a correlation between the predefined patterns and the or each image component IMC(n). The determined correlation may be expressed as a correlation value, for example expressed as a percentage value, an integer or a real number. A correlation filter is applied to the determined correlation value. The correlation filter compares the determined correlation value to a correlation threshold to determine if there is a match between the image component IMC(n) and the predefined pattern. The correlation threshold is predefined. If the determined correlation value is lower than the correlation threshold, the image processing module 10b determines that the image component IMC(n) does not correspond to the predefined pattern and outputs an invalid classification signal. If the determined correlation value is greater than the correlation threshold, the image processing module 10b classifies the image component IMC(n) as corresponding to the predefined pattern and outputs a valid classification signal. If the image processing module 10b determines that the image component IMC(n) may correspond to more than one of the predefined patterns, the match providing the highest correlation value is selected.

The correlation filter in the present embodiment is a dynamic filter. As such, the correlation threshold may be varied in dependence on vehicle operating conditions. By raising or lowering the correlation threshold, the level of correlation required between an image component IMC(n) and one of the predefined patterns to trigger a valid classification may be adjusted dynamically. In accordance with an embodiment, the correlation filter is controlled in dependence on the surface roughness coefficient SRC. In particular, the correlation threshold is inversely proportional to the surface roughness coefficient SRC. If the surface roughness coefficient SRC is high (signifying a rough or irregular surface), the correlation threshold is reduced in order to broaden the classification envelope. Conversely, if the surface roughness coefficient SRC is low (signifying a smooth surface), the correlation threshold is increased in order to narrow the classification envelope. The dynamic control of the correlation can help maintain the low false positive count for a smooth surface (i.e. having a low surface roughness coefficient SRC), while helping to classify more objects when the host vehicle 2b is traversing a rougher surface by expanding the detection and weighting criteria when a rougher surface is traversed (i.e. having a higher surface roughness coefficient SRC).

The object classification system 1b has particular application in an off-road environment. When the host vehicle 2b is travelling off-road, the host vehicle 2b may be subject to sudden changes in direction and/or orientation that make the acquisition and tracking of the target vehicle 5b more challenging. The object classification system 1b may be selectively activated when the host vehicle 2b is travelling off-road, for example in response to a user input or automatically when an off-road driving mode is selected. It will be understood that the surface roughness coefficient SRC as the host vehicle 2b travels along a route. These variations in the surface roughness coefficient SRC are illustrated in FIG. 4b which illustrate the surface roughness coefficient SRC in five sections dt1-dt5 of a single route. The image processing module 10b grades the surface SF as being smooth in the first, third and fifth sections dt1, dt3, dt5 of the route and sets the surface roughness coefficient SRC as equal to 0 in each of these sections. However, the image processing module 10b determines that the surface SF is very rough in the second section dt2 and defines sets the surface roughness coefficient SRC as equal to one in this section. For the fourth section dt4, the image processing module 10b determines that the surface SF as an intermediate roughness and sets the surface roughness coefficient SRC as equal to 0.8.

The ability to classify objects over a larger range of operating conditions may facilitate tracking of a target vehicle 5b, for example when the host vehicle 2b is following the target vehicle 5b in a convoy. The target vehicle 5b may, for example, be a lead vehicle. The object classification system 1b may track the target vehicle 5b with respect to time. The object classification system 1b may thereby determine a route or path along which the target vehicle 5b is travelling.

The object classification system 1b may track the target vehicle 5b, for example to determine the route taken by the target vehicle 5b. The object classification system 1b may generate a corresponding target route for the host vehicle 2b. At least in certain embodiments, the image processing module 10b may calculate the speed and/or the trajectory of the target vehicle 5b.

It will be understood that the object classification system 1b may be operable to identify and/or classify one or more objects 3b, for example to identify a plurality of target vehicles 5b. This may be applicable when the host vehicle 2b is travelling in a convoy, for example to identify and classify one or more target vehicles 5b travelling in front of the host vehicle 2b in a convoy.

The object classification system 1b has been described with particular reference to sensing means 9b which is forward facing to enable detection and classification of objects in front of the host vehicle 2b when it is travelling a forward direction. It will be understood that embodiments of the invention may be implemented in other configurations, for example comprising sensing means 9b which is side-facing and/or rear-facing.

The surface roughness coefficient SRC could be determined by a downward-facing camera, for example a camera mounted in a wing mirror of the vehicle.

The object classification system 1b has been described as determining the surface roughness coefficient SRC. It will be understood that the IMU 15b may be configured to determine the surface roughness coefficient SRC. For example, the IMU 15b may grade or otherwise classify the surface SF over which the host vehicle 2b is travelling.

A terrain inference system 1c in accordance with an embodiment of the present disclosure will now be described with reference to accompanying FIGS. 1c-7ciii.

Figure 1C:
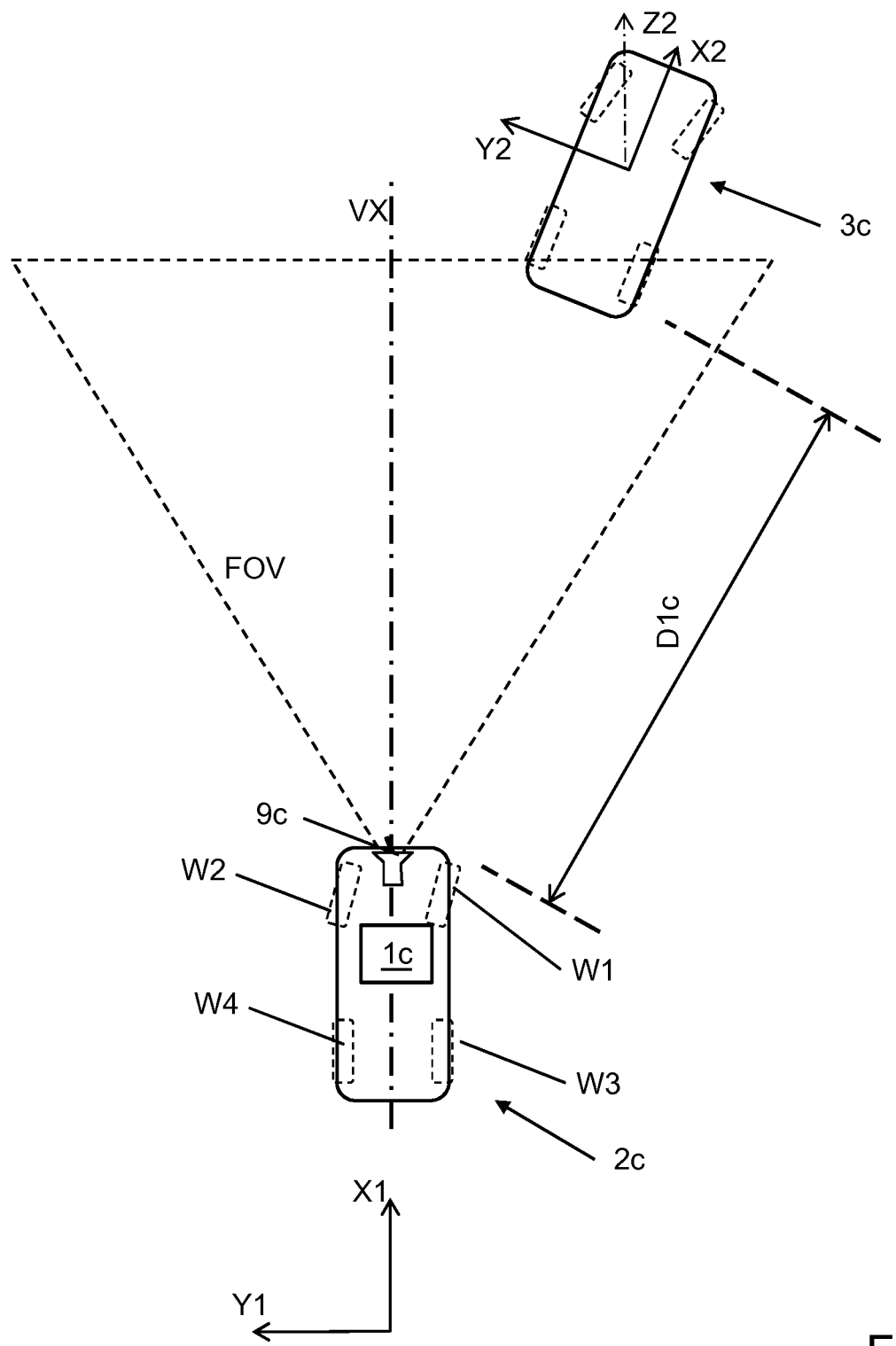
FIG. 1c shows a plan view of a host vehicle incorporating an object classification system in accordance with an embodiment.
Figure 2C:
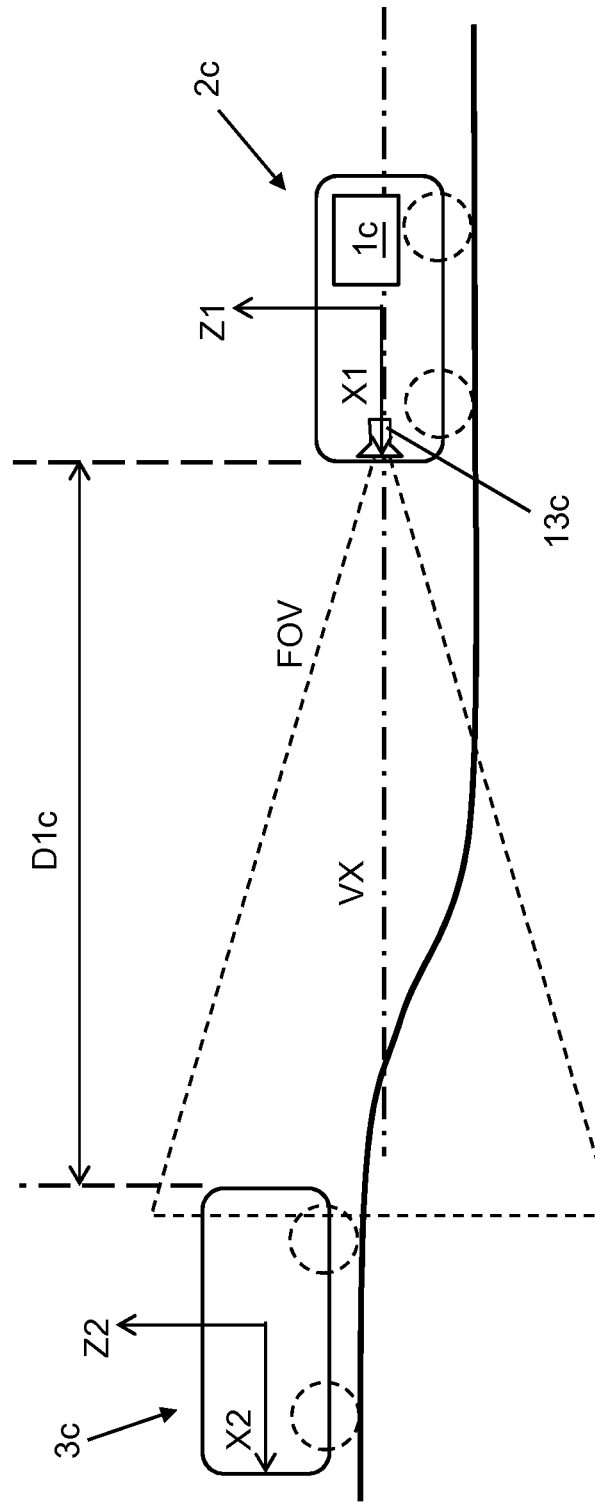
FIG. 2c shows a side elevation of the host vehicle shown in FIG. 1a incorporating the object classification system in accordance with an embodiment.

As illustrated in FIGS. 1c and 2c, the terrain inference system 1c is installed in a host vehicle 2c. The host vehicle 2c is a wheeled vehicle, such as an automobile or an off-road vehicle. The terrain inference system 1c is operable to detect a target vehicle 3c. The target vehicle 3c is a wheeled vehicle, such as an automobile or an off-road vehicle. The host vehicle 2c and the target vehicle 3c are both land vehicles (i.e. vehicles configured to apply steering and drive (traction) forces against the ground). The target vehicle 3c may, for example, be travelling in front of the host vehicle 2c. For example, the target vehicle 3c may be a lead vehicle or a vehicle in front of the host vehicle 2c in a convoy. In this scenario, the host vehicle 2c may be a following vehicle which is travelling along the same route as the target vehicle 3c.

The host vehicle 2c described herein comprises a first reference frame comprising a longitudinal axis X1, a transverse axis Y1 and a vertical axis Z1. The target vehicle 3c described herein comprises a second reference frame comprising a longitudinal axis X2, a transverse axis Y2 and a vertical axis Z2. The orientation of the first and second reference frames is described herein with reference to a horizontal axis X and a vertical axis Z.

The host vehicle 2c comprises four wheels W1-W4. A torque is transmitted to the wheels W1-W4 to apply a tractive force to propel the host vehicle 2c. The torque is generated by one or more torque generating machines, such as an internal combustion engine or an electric traction machine, and transmitted to the driven wheels W1-W4 via a vehicle powertrain. The host vehicle 2c in the present embodiment has four-wheel drive and, in use, torque is transmitted selectively to each of said wheels W1-W4. It will be understood that the terrain inference system 1c could also be installed in a host vehicle 2c having two-wheel drive. The host vehicle 2c in the present embodiment is an automobile having off-road driving capabilities. For example, the host vehicle 2c may be capable of driving on an un-metalled road, such as a dirt road or track. The host vehicle 2c may, for example, be a sports utility vehicle (SUV) or a utility vehicle, but it will be understood that the terrain inference system 1c may be installed in other types of vehicle. The terrain inference system 1c may be installed in other types of wheeled vehicles, such as light, medium or heavy trucks. The target vehicle 3c may have the same configuration as the host vehicle 2c or may have a different configuration.

Figure 3C:
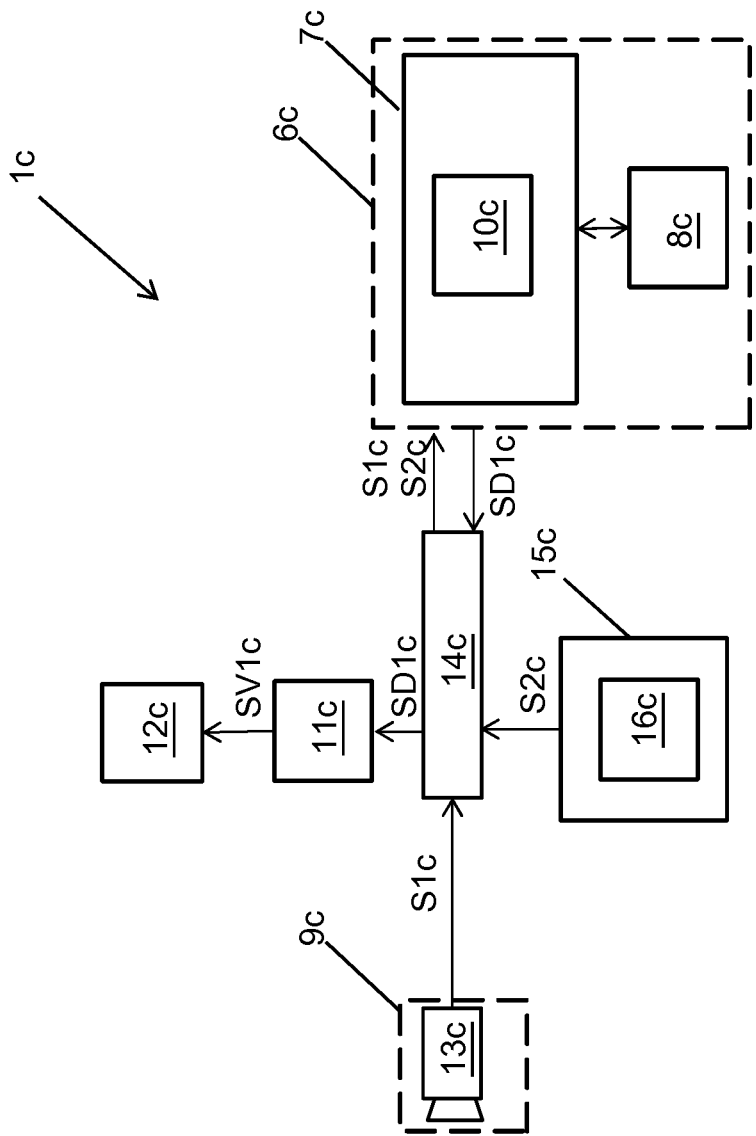
FIG. 3c shows a schematic representation of the object classification system incorporated into the host vehicle shown in FIGS. 1c and 2c.

A schematic representation of the terrain inference system 1c installed in the host vehicle 2c is shown in FIG. 3c. The terrain inference system 1c comprises a controller 6c having at least one electronic processor 7c and a memory 8c. The processor 7c is operable to receive a data signal S1c, from a sensing means 9c. As described herein, the processor 7c is operable to process the image data signal S1c. In the present embodiment, the processor 7c is configured to implement an image processing module 10c to analyse the image data signal S1c. The image processing module 10c is configured to detect the target vehicle 3c and to determine an attitude (orientation) and/or movement of the target vehicle 3c. The processor 7c may optionally also control operation of the host vehicle 2c in dependence on the relative location of the target vehicle 3c. For example, the processor 7c may be operable to control a target follow distance D1c between the host vehicle 2c and the target vehicle 3c.

The processor 7c may control selection of one or more driving modes of the host vehicle 2c in dependence on the monitoring of the target vehicle 3c. For example, the processor 7c may be configured to control one or more of the following systems: Terrain Response (TR), All-Terrain Progress Control (ATPC), Hill Descent Control, Electronic Traction Control (ETC), Adaptive Dynamics, Dynamic Stability Control (DSC), and variable ratio Electric Power-Assisted Steering (EPAS). In a Terrain Response system, a vehicle controller is configured to control a plurality of vehicle subsystems, such as engine, throttle, transmission, suspension, brakes, traction control, stability control etc., each of which is able to operate in a plurality of subsystem configuration modes. The vehicle controller selects the appropriate subsystem configuration mode for each of a plurality of the subsystems so as to improve or optimise vehicle performance for a specific driving surface or terrain, such as sand, gravel, mud, ruts, snow, ice, rocks etc.

The processor 7c may, for example, control one or more of the following set: suspension settings; throttle response; brake response; and transmission settings. Alternatively, or in addition, the processor 7c may output a target follow distance signal SD1 to a cruise control module 11c. The cruise control module 11c may be selectively operable in a follow mode suitable for controlling a target speed of the host vehicle 2c to maintain the target follow distance D1c between the host vehicle 2c and the target vehicle 3c. The cruise control module 11c may output a target speed signal SV1c to an engine control module 12c which controls the output torque transmitted to the wheels W1-W4. The cruise control module 11c may also generate a brake control signal for controlling a braking torque applied to said wheels W1-W4. The processor 7c may optionally also output a steering control signal (not represented) to control an electronic power assisted steering module (not shown) to control a steering angle of the host vehicle 2c. The steering control signal SD1c may be output to control the host vehicle 2c to follow the path taken by the target vehicle 3c.

As illustrated in FIGS. 1c and 2c, the sensing means 9c is mounted in a forward-facing orientation to establish a detection region in front of the host vehicle 2c. The sensing means 9c in the present embodiment comprises at least one optical sensor 13c mounted to the host vehicle 2c. The sensing means 9c may comprise a single camera. Alternatively, the sensing means 9c may comprise a stereoscopic camera. The at least one optical sensor 13c may be mounted at the front of the host vehicle 2c, for example incorporated into a front bumper or engine bay grille; or may be mounted within the vehicle cabin, for example in front of a rear-view mirror. The at least one optical sensor 13c has a field of view FOV having a central optical axis VX extending substantially parallel to the longitudinal axis X1 of the host vehicle 2c. The field of view FOV is generally conical in shape and extends in horizontal and vertical directions. The at least one optical sensor 13c comprises a digital imaging sensor for capturing image data. The image data comprises an image IMG1c corresponding to a scene within the field of view FOV of the at least one optical sensor 13c. The image data is captured substantially in real-time, for example at 30 frames per second. The at least one optical sensor 13c in the present embodiment is operable to detect light in the visible spectrum of light. The sensing means 9c comprises optics (not shown) for directing the incident light onto an imaging sensor, such as a charge-coupled device (CCD), operable to generate image data for transmission in the image data signal S1c. Alternatively, or in addition, the sensing means 9c may be operable to detect light outside of the visible light spectrum, for example in the infra-red range to generate a thermographic image. Alternatively, or in addition, the sensing means 9c may comprise a Lidar sensor for projecting a laser light in front of the host vehicle 2c. Other types of sensor are also contemplated.

The sensing means 9c is connected to the controller 6c over a communication bus 14c provided in the host vehicle 2c, as shown in FIG. 3c. The image data signal S1c is published to the communication bus 14c by the sensing means 9c. In the present embodiment, the connection between the sensing means 9c and the controller 6c comprises a wired connection. In alternative embodiments, the connection between the sensing means 9c and the controller 6c may comprise a wireless connection, for example to enable remote positioning of the sensing means 9c. By way of example, the sensing means 9c may be provided in a remote targeting system, such as a drone vehicle. The processor 7c is operable to read the image data signal S1c from the communication bus 14c. The processor 7c extracts image data from the image data signal S1c. In accordance with an embodiment, the image processing module 10c is configured to infer one or more characteristics of the terrain over which the target vehicle 3c is travelling in dependence on a determined attitude (orientation) and/or a determined movement of the target vehicle 3c. The image processing module 10c cross-references the inferred terrain characteristic(s) with a determined geospatial location of the target vehicle 3c. The image processing module 10c may thereby compile terrain data remote from the host vehicle 2c. The resulting terrain data is particularly useful if the host vehicle 2c is following the target vehicle 3c along a particular route, as the host vehicle 2c will in due course traverse the same terrain. Accordingly, the terrain data may be used proactively to coordinate vehicle systems prior to encountering the terrain. The operation of the image processing module 10c will now be described.

The image processing module 10c parses the image data from the at least one optical sensor 13c to identify one or more image components IMC(n) within an image IMG1c. The image components IMC(n) are preferably persistent features within the image IMG1c detectable within the image data for at least a predetermined time period or over a predetermined number of frames, for example two or more successive frames. In certain embodiments, the image components IMC(n) may comprise an identifiable feature or element contained within the image IMG1c, for example comprising a plurality of pixels which are present in successive frames. The image processing module 10c implements an edge detection algorithm to detect edges within the image data. The image processing algorithm may, for example, be configured to identify points where the image brightness comprises discontinuities, particularly those points arranged into linear or curved line segments which may correspond to an edge. The image processing module 10c may apply a brightness threshold (which may be a predetermined threshold or a dynamic threshold) to identify the edges of the image components IMC(n) within the image IMG1c. The identified edge(s) may be incomplete, for example in regions where image discontinuities are less pronounced. The image processing module 10c may complete the edges, for example utilising a morphological closing technique, to form a closed region. The or each closed region is identified as a discrete image component IMC(n). By repeating this process, the image processing algorithm may identify each image component IMC(n) contained within the image data.

The image processing module 10c implements a pattern matching algorithm to compare each of the image components IMC(n) identified in the image IMG1c to predefined patterns stored in memory 8c. The image processing module 10c classifies each of the image components IMC(n) in dependence on the correlation between each image component IMC(n) with the predefined patterns. The image processing module 10c may, for example, classify each image component IMC(n) as one of the following set: an obstacle; a target vehicle 3c; a cyclist; a person (not shown); an animal, etc. In the present embodiment, the image processing module 10c is configured to identify the target vehicle 3c within the image IMG1c. The pattern matching algorithm is implemented to determine if any of the image components IMC(n) identified in the image data (partially or completely) match one or more predefined patterns. The predefined patterns may, for example, comprise an object model defined in two-dimensions (2-D) or three-dimensions (3-D). The predefined patterns may be stored in the memory 8c and accessed by the image processing module 10c. In the present embodiment, the predefined patterns correspond to a shape and/or profile of one or more target vehicles 3c. Optionally, the predefined patterns may define a colour of the target vehicle 3c, for example specified by a user or identified during an initial calibration procedure. Alternatively, or in addition, the predefined patterns may comprise a registration (number) plate mounted to an exterior of the target vehicle 3c. The registration (number) plate comprises one or more alphanumeric characters and the attitude of the target vehicle 3c may be determined by analysing the image IMG1c to determine the perspective of said alphanumeric characters. The pattern corresponding to the registration (number) plate may be defined during a calibration phase. Known pattern matching techniques may be used to determine a correlation between the predefined patterns and the or each image component IMC(n). The image component IMC(n) corresponding to the target vehicle 3c may thereby be identified within the image IMG1c.

The image processing module 10c is configured to analyse the image component IMC(n) corresponding to the target vehicle 3c to estimate the attitude of the target vehicle 3c. For example, the image processing module 10c may analyse the image component IMC(n) to estimate one or more of the following set: a target vehicle pitch angle ($\theta 2$), a target vehicle roll angle ($\beta 2$), and a target vehicle yaw angle ($\gamma 2$). The target vehicle pitch angle ($\theta 2$) is the included angle between the longitudinal axis X2 and the horizontal axis X. The target vehicle roll angle ($\beta 2$) is the included angle between the vertical axis X2 and the vertical axis Z. The target vehicle yaw angle ($\gamma 2$) is the included angle between the longitudinal axis X1 of the host vehicle 2c and the longitudinal axis Z2 of the target vehicle 3c. The image processing module 10c may optionally also monitor movement of the target vehicle 3c. The image processing module 10c may analyse changes in the image component IMC(n) with respect to time to estimate one or more of the following set: longitudinal movement (speed and/or acceleration) of the target vehicle 3c; lateral movement (speed and/or acceleration) of the target vehicle 3c, for example caused by side-slipping; and/or vertical movement (speed and/or acceleration) of the target vehicle 3c. Alternatively, or in addition, the image processing module 10c may analyse changes in the image component IMC(n) with respect to time to estimate one or more of the following set: a change or rate of change of the target vehicle pitch angle ($\theta 2$), a change or rate of change of the target vehicle roll angle ($\beta 2$), and a change or rate of change of the target vehicle yaw angle ($\gamma 2$). It will be understood that the image processing module 10c may operate in conjunction with other sensors provided on the host vehicle 2c to monitor the target vehicle 3c. The host vehicle 2c may comprise additional sensors suitable for tracking the movement of the target vehicle 3c. By way of example, the host vehicle 2c may comprise one or more of the following set: an ultrasound sensor, a radar sensor and a lidar sensor.

The image processing module 10c may optionally also estimate the position of the target vehicle 3c relative to the host vehicle 2c. For example, the image processing module 10c may determine the relative position of the target vehicle 3c in dependence on the size of the image component IMC(n) within the image IMG1c; and/or the position of the image component IMC(n) within the image IMG1c. By combining a known location of the host vehicle 2c, for example derived from a global positioning system (GPS), with the relative position determined by the image processing module 10c, a geospatial location of the target vehicle 3c may be determined. Alternatively, or in addition, the host vehicle 2c may receive geospatial location data transmitted from the target vehicle 3c, for example using a suitable vehicle-to-vehicle communication protocol. The image processing module 10c outputs a target vehicle data signal ST1c to the terrain inference system 1c.

It will be understood that the scene captured by the sensing means 9c is dependent on the attitude of the host vehicle 2c and/or movements of the host vehicle 2c. In order to compensate for changes in the attitude and/or movements of the host vehicle 2c, the terrain inference system 1c in the present embodiment is configured to receive an inertial measurement signal S2c from an inertial measurement unit (IMU) 15c provided in the host vehicle 2c. The IMU 15c comprises one or more sensors 16c for measuring inertial movement of the host vehicle 2c. The one or more sensors 16c measure a host vehicle pitch angle ($\theta 1$) and a host vehicle roll angle ($\beta 1$). The host vehicle pitch angle ($\theta 1$) is the included angle between the longitudinal axis X1 and the horizontal axis X. The host vehicle roll angle ($\beta 1$) is the included angle between the vertical axis X1 and the vertical axis Z. The IMU 15c may determine a change (or a rate of change) of the host vehicle pitch angle ($\theta 1$) and a change (or rate of change) of the host vehicle roll angle ($\beta 1$). The one or more sensors 16c may comprise one or more accelerometers (not shown) and/or one or more gyroscopes (not shown). The terrain inference system 1c analyses said inertial measurement signal S2c to determine movements of the host vehicle 2c. Optionally, one or more movements of the host vehicle 2c may be estimated, for example in dependence on the inertial measurement signal S2c. The estimation of one or more movements of the host vehicle 2c may, for example, be appropriate if the IMU 15c does not include a sensor for one or more degrees of movement.

Figure 4C:
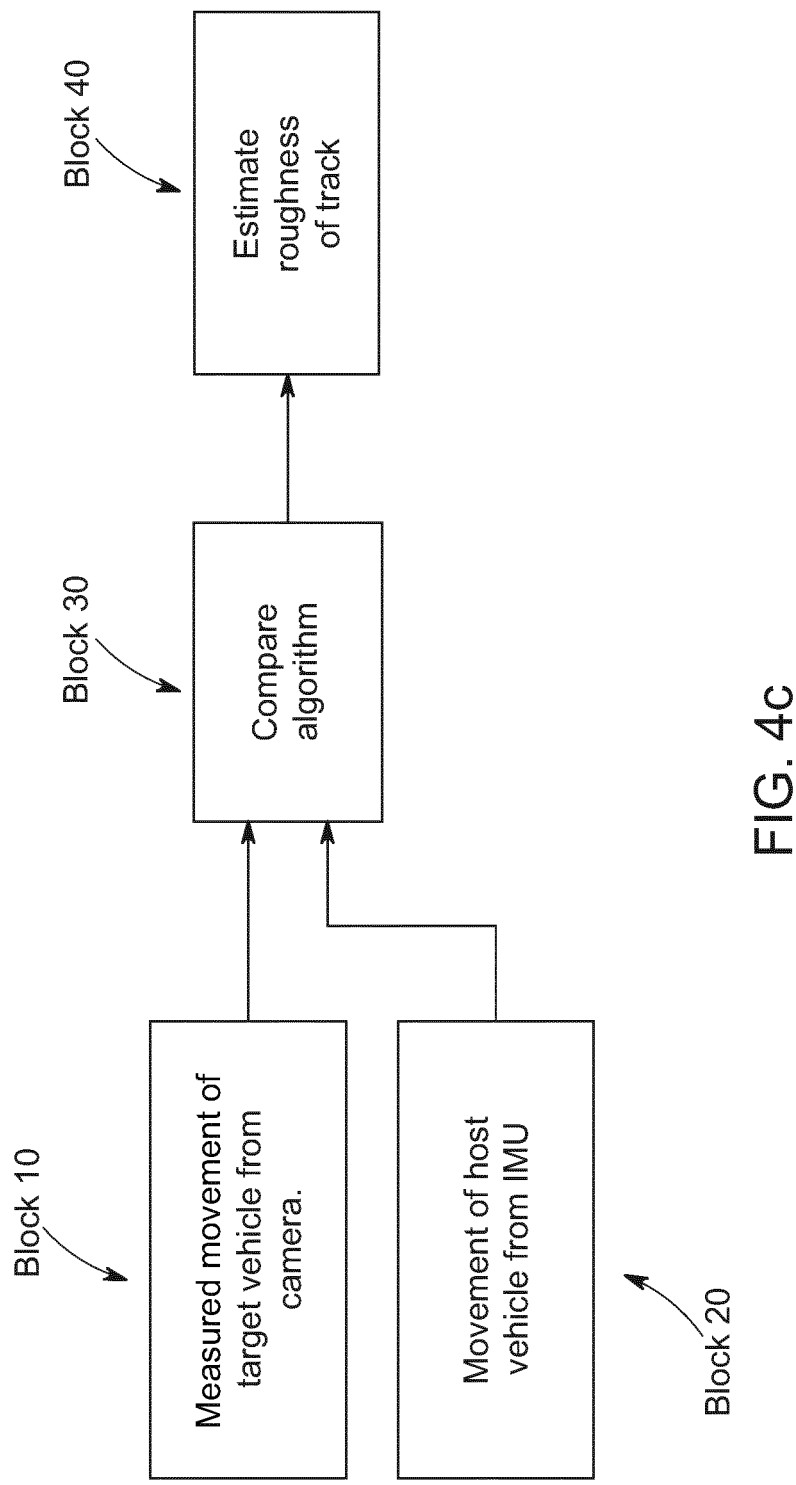
FIG. 4c shows a schematic representation of the combination of the data sets from the inertial measurement unit and the image processing module.

As shown in FIG. 4c, the terrain inference system 1c is configured to correct the measured attitude and/or movements of the target vehicle 3c in dependence on the determined attitude and/or movements of the host vehicle 2c. The orientation and the movement of the host vehicle 2c are derived from the IMU 15c (BLOCK 10); and the measured orientation and movement of the target vehicle 3c are derived from the image processing module 10c (BLOCK 20). A comparison algorithm is applied (BLOCK 30) to compare both data sets. The comparison algorithm may, for example, subtract the orientation and the movement of the host vehicle 2c from the measured orientation and movement of the target vehicle 3c to determine a corrected orientation and movement of the target vehicle 3c. The corrected orientation of the target vehicle 3c may, for example, be defined relative to a horizontal axis and a vertical axis. The terrain inference system 1c uses the corrected orientation and movement of the target vehicle 3c to estimate the one or more terrain characteristics (BLOCK 40). The terrain inference system 1c may, for example, apply an inverse dynamics model to infer the at least one terrain characteristic. By monitoring the dynamic behaviour of the target vehicle 3c, the terrain inference system 1c may infer one or more characteristics of the terrain over which the target vehicle 3c is travelling. The terrain inference system 1c may, for example, determine a surface gradient in dependence on the corrected orientation of the target vehicle 3c. The surface gradient may be inferred with reference to the long period behaviour of the target vehicle 3c. The terrain inference system 1c may infer characteristics of the surface roughness by virtue of the magnitude and/or range and/or frequency of changes in the orientation of the target vehicle 3c. For example, if the orientation of the target vehicle 3c is changing with a high frequency, the terrain inference system 1c may infer that the target vehicle 3c is travelling over a rough or irregular surface. The magnitude of the changes in the orientation of the target vehicle 3c may provide an indication of the size of any surface irregularities. The frequency of the changes in the orientation of the target vehicle 3c may provide an indication of the number of surface irregularities. The surface roughness may be inferred with reference to the short period behaviour of the target vehicle 3c. The surface composition may be inferred with reference to the position and/or the attitude of the target vehicle 3c relative to the surface.

The terrain inference system 1c may grade the terrain, for example by determining a surface roughness coefficient SRC. The surface roughness coefficient SRC provides an indication of the roughness of a surface SF over which the target vehicle 3c is travelling. The surface roughness coefficient SRC may, for example, provide an indication of the size and/or prevalence of surface irregularities. The surface roughness coefficient SRC may be determined in dependence on the magnitude and/or frequency of target vehicle movements, for example vertical movements. Alternatively, or in addition, the surface roughness coefficient SRC may be determined in dependence on changes in the target vehicle pitch angle ($\theta$1) and/or the target vehicle roll angle ($\beta$1). The surface roughness coefficient SRC may be determined in dependence on the period of any such movements, for example differentiating between short-period oscillations and long-period oscillations of the target vehicle 3c. In the present embodiment, the surface roughness coefficient SRC is in the range zero (0) to one (1), inclusive. The surface roughness coefficient SRC is set equal to one (1) if the surface is deemed to be very rough, for example corresponding to terrain that cannot be traversed by the host vehicle 2c. The surface roughness coefficient SRC is set equal to zero (0) if the surface is deemed to be smooth, for example corresponding to a metalled road surface. The surface roughness coefficient SRC may grade the surface roughness between these endpoints. For example, a surface which is slightly rough may have a surface roughness coefficient SRC of 0.6.

Figure 5B:
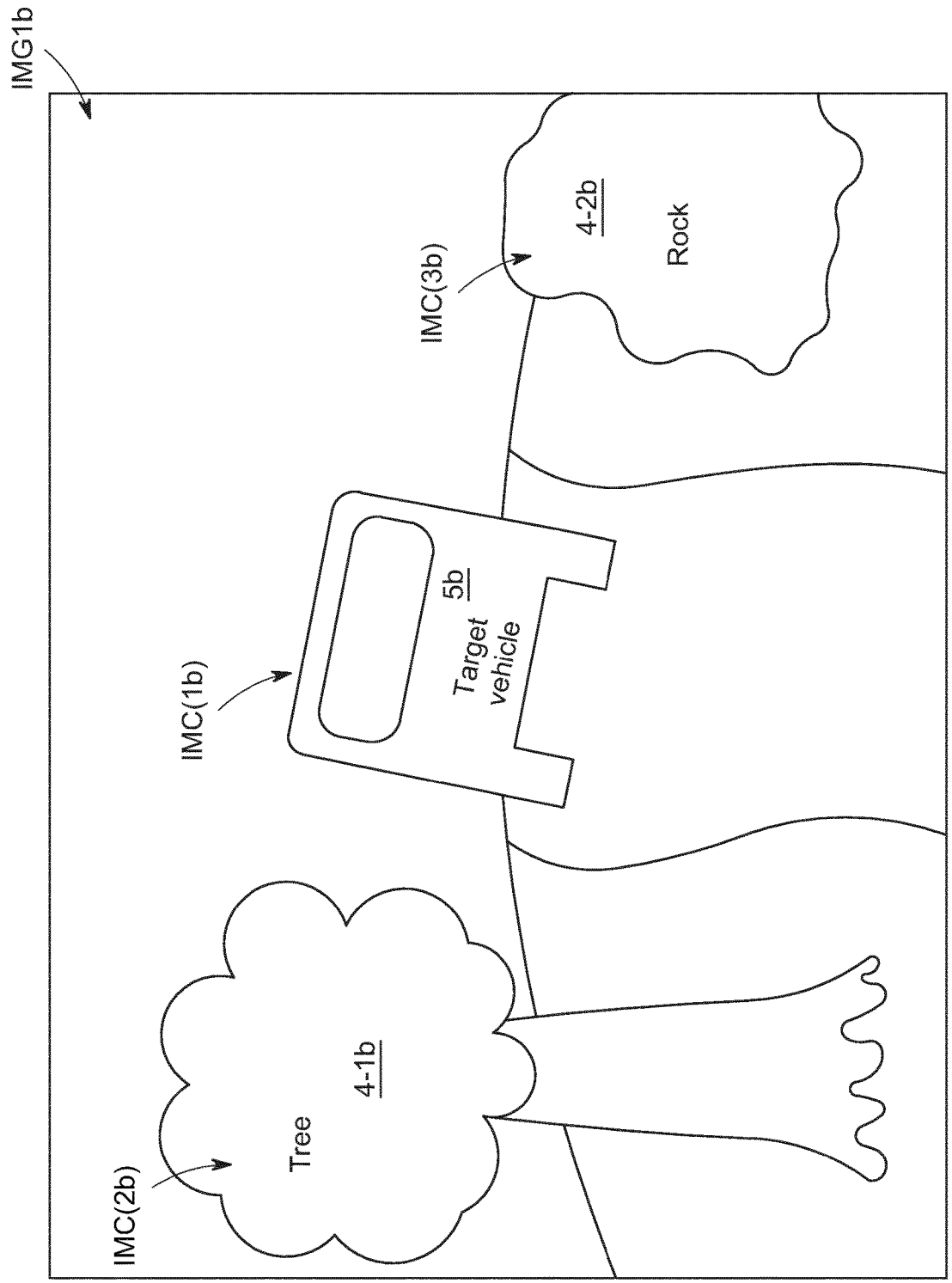
FIG. 5b shows an example image captured by the optical sensor and analysed to classify discrete image components in accordance with an embodiment.
Figure 5C:
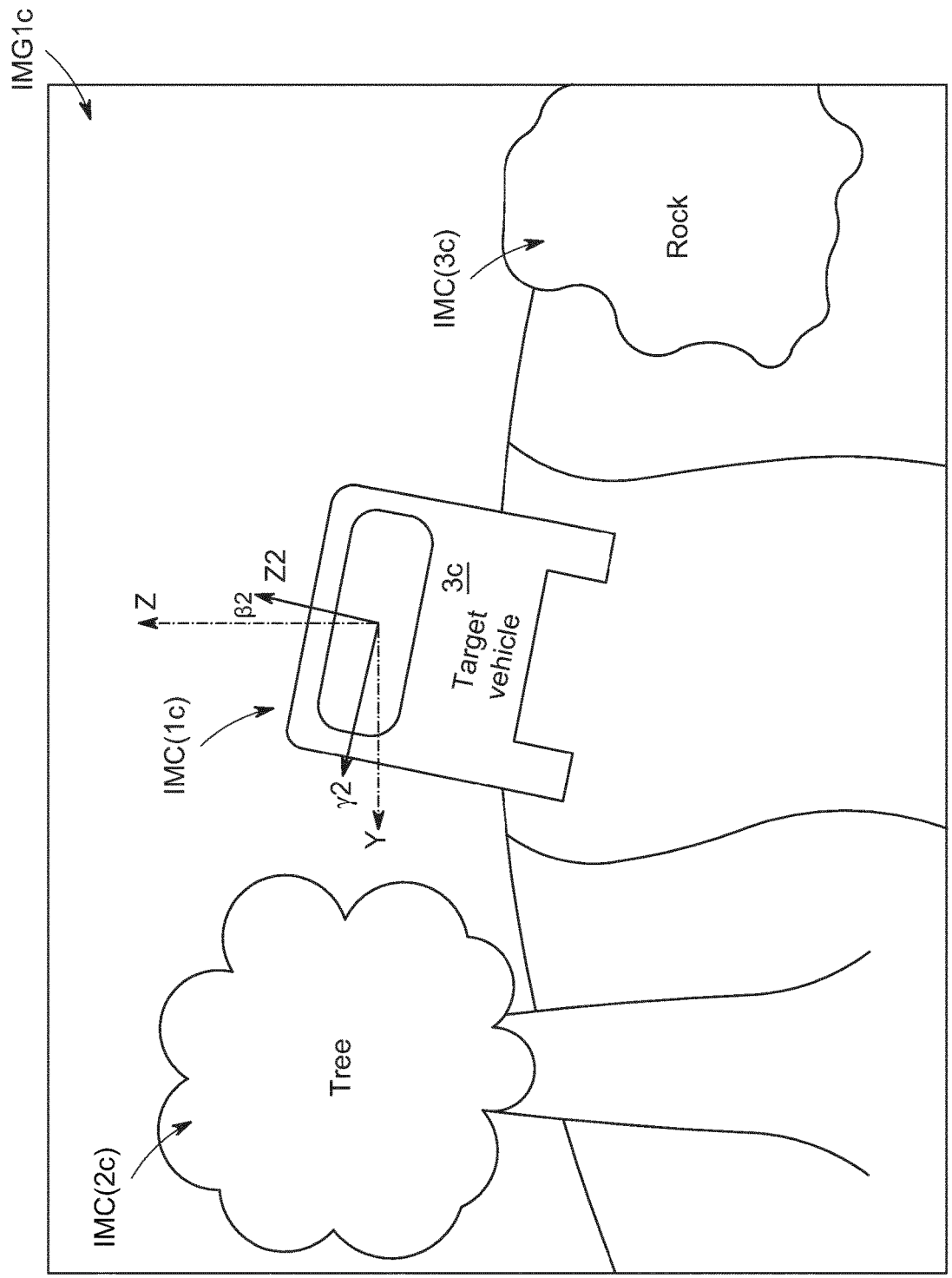
FIG. 5c shows an example image captured by the optical sensor and analysed to detect a discrete image components corresponding to the target vehicle.

The operation of the terrain inference system 1c will now be described. An exemplary image IMG1c captured by the sensing means 9c disposed on the host vehicle 2c is shown in FIG. 5c. The image processing module 10c identifies a plurality of image components IMC(n) within the image IMG1c. Using appropriate pattern matching techniques, the image processing module 10c classifies a first of said image component IMC(1c) as corresponding to the target vehicle 3c. The image processing module 10c analyses the first image component IMC(1c) to determine the target vehicle pitch angle ($\theta$2), target vehicle roll angle ($\beta$2), and the target vehicle yaw angle ($\gamma$2). The terrain inference system 1c determines the host vehicle pitch angle ($\theta$1) and host vehicle roll angle ($\beta$1) in dependence on the inertial measurement signal ST2 received from the IMU 15c. By combining the datasets relating to the host vehicle 2c and the target vehicle 3c, the terrain inference system 1c determines the corrected orientation and/or corrected movement of the target vehicle 3c. The image processing module 10c in the present embodiment is configured to track the first image component IMC(1c), for example over successive frames of the image data or at predetermined time intervals. The image processing module 10c may thereby monitor the target vehicle 3c.

As shown in FIG. 6ci, the height H (elevation) of the target vehicle 3c relative to the host vehicle 2c may be determined in dependence on the vertical position of the first image component IMC(1c) within the first image IMG1c. By determining a longitudinal distance between the host vehicle 2c and the target vehicle 3c, the terrain inference system may estimate a minimum inclination angle ($\alpha$) of the surface between the host vehicle 2c and the target vehicle 3c. As shown in FIG. 6cii, the target vehicle roll angle ($\beta$1) is calculated by comparing a vertical axis of the first image component IMC(1c) to a reference vertical axis. The terrain inference system 1c may thereby determine that the target vehicle 3c is disposed on an inclined surface having a side slope angle substantially equal to the calculated target vehicle roll angle ($\beta$2). As shown in FIG. 6ciii, the terrain inference system 1c determines the surface roughness coefficient SRC in dependence on the magnitude and/or frequency of changes in the vertical position of the target vehicle 3c. The terrain inference system 1c may optionally also consider the magnitude and/or frequency of changes in the target vehicle pitch angle ($\theta$2). As outlined above, the terrain characteristics are cross-referenced with the determined geospatial location of the target vehicle 3c, for example to generate a terrain map.

The terrain inference system 1c in accordance with the present embodiment has particular application in an off-road environment. When the host vehicle 2c and the target vehicle 3c are travelling off-road, the determination of the terrain characteristics is usually more important than in an on-road environment. The terrain inference system 1c may be selectively activated when the host vehicle 2c is travelling off-road, for example in response to a user input or automatically when an off-road driving mode is selected. The terrain inference system 1c may track the target vehicle 3c, for example to determine the route taken by the target vehicle 3c. The terrain inference system 1c may generate a corresponding target route for the host vehicle 2c. At least in certain embodiments, the image processing module 10c may calculate the speed and/or the trajectory of the target vehicle 3c. It will be understood, however, that the terrain inference system may be utilised in an on-road setting (i.e. a metalled surface), for example to facilitate identification of a traffic calming measure, such as a speed hump or a speed table, or a pothole.

A variant of the terrain inference system 1c will now be described with reference to FIGS. 7A, 7B and 7C. Like reference numerals are used for like components. The terrain inference system 1c is suitable for inferring the presence of an obstacle 20c, such as a pothole or other terrain feature, in the path of the target vehicle 3c. The obstacle 20c may be present in a metalled surface or un-metalled surface.

The terrain inference system 1c comprises at least one optical sensor 13c configured to capture an image IMG2c. The optical sensor 13c in the present embodiment comprises a forward-facing camera disposed on the host vehicle 2c and operable to capture a video image, for example comprising twenty (20) images per second. The camera may comprise a mono camera or a stereoscopic camera. As described herein, the image processing module 10c is configured to process the images captured by the optical sensor 13c to identify and track the target vehicle 3c. An exemplary image IMG2c captured by the optical sensor 13c is shown in FIG. 7ci. The image processing module 10c analyses the image IMG2c to identify and classify an image component IMC(1c) corresponding to the target vehicle 3c. The image processing module 10c adds a bounding box 17c around the image component IMC(1c) in the image IMG2c. A suitable method of generating the bounding box 17c comprises identifying corners 18A-D of the image component IMC(1c). Horizontal and vertical lines are drawn between the corners 18A-D to complete the bounding box 17c. The image processing unit 10c is configured to perform this operation at least substantially in real-time. The bounding box 17c moves with the target vehicle 3c, thereby enabling the image processing module 10c to track movement of the target vehicle 3c in a sequence of images. Over a period of time the image processing module 10c will track the bounding box 17c and determine its normal range of movement in a vertical direction and/or a transverse direction. Alternatively, or in addition, the terrain inference system 1c may comprise a radar sensor or other type of sensor.

Upon identifying an obstacle 20c, a driver of a vehicle may elect to drive over the obstacle 20c or to drive around the obstacle 20c. If the vehicle drives over the obstacle 20c, there is typically a corresponding vertical movement of the vehicle. If the vehicle drives around the obstacle 20c, there is a corresponding lateral movement of the vehicle. The terrain inference system 1c in the present embodiment is configured to identify short period perturbations which may correspond to a target vehicle 3c driving over or around an obstacle 20c. Any such perturbations may indicate that the target vehicle 3c is reacting to an obstacle 20c in its path. The terrain inference system 1c may infer terrain characteristics in dependence on the perturbations in the movement of the target vehicle 3c. By analysing the movement of the target vehicle 3c, the terrain inference system 1c may categorise the type or nature of the obstacle 20c. For example, if the obstacle 20c is a pothole, the movement may comprise a downwards movement followed by an upwards movement. If the obstacle 20c is a ridge or a speed hump, the movement may comprise an upwards movement followed by a downwards movement. The terrain inference system 1c may identify such movements in the target vehicle 3c and infer characteristics of the obstacle 20c. The host vehicle 2c may act upon this information and take appropriate pre-emptive action to mitigate the effect of the obstacle 20c. In dependence on the terrain characteristics inferred by the terrain inference system 1c, the host vehicle 2c could, for example, implement a steering change, or may re-configure a vehicle suspension, for example by changing damper settings.

The operation of the terrain inference system 1c to infer terrain characteristics is illustrated with reference to the images IMG3c and IMG4c shown in FIGS. 7cii and 7ciii respectively. The obstacle 20c in the illustrated examples comprises a pothole. If the target vehicle 3c drives over the pothole with one wheel, there is a sudden movement of the target vehicle 3c which causes a rolling motion. This rolling motion of the target vehicle 3c can be detected by analysing the image IMG3c. In particular, the image processing module may estimate a target vehicle roll angle ($\beta$) by calculating an angle between the top and bottom sides of the bounding box 17c and a horizontal reference plane Y.

Alternatively, or in addition, the image processing module may be configured to detect vertical movement of the target vehicle 3c by monitoring the position of the bounding box 17c. The vertical movement of the target vehicle 3c may be detected by monitoring the vertical position of one or more sides of the bounding box 17c in the image IMG3c. If the target vehicle 3c traverses a pothole or a speed restriction hump with both wheels, the resulting movement of the target vehicle 3c would comprise a vertical movement with or without a change in the roll angle. The image processing module may be configured to detect a corresponding change in the vertical position of the bounding box 17c in the image IMG3c.

Alternatively, or in addition, at least one threshold may be predefined for relative movement of diametrically opposed corners 18A-D of the bounding box 17c. If the movement of the diametrically opposed corners 18A-D of the bounding box 17c exceeds the predefined threshold(s), the image processing module may determine that the target vehicle 3c has traversed a pothole. The at least one threshold may be generated from one or more previous observations of the target vehicle 3c. The at least one threshold may be calibrated by comparing detected movements of the target vehicle 3c with measured behaviour of the host vehicle 2c traversing the same obstacle 20c. The thresholds may be adjusted dynamically, for example adjusted in dependence on an estimated speed of the target vehicle 3c.

If the target vehicle 3c drives around the obstacle 20c, there is a change in the trajectory of the target vehicle 3c. This change in trajectory may occur rapidly as the driver of the vehicle may have a relatively short period of time in which to drive around the obstacle 20c. As illustrated in FIG. 7ciii, if the target vehicle 3c drives around a pothole, there is a first lateral movement to avoid the pothole which may optionally be followed by a second lateral movement to return target vehicle 3c to the original trajectory. In this example, it will be appreciated that the first and second lateral movements are in opposite directions. The image processing module 10c may be configured to detect the first lateral movement and optionally also the second lateral movement of the target vehicle 3c which are indicative of an avoidance manoeuvre. The image processing module may detect the lateral movement(s) of the target vehicle 3c by identifying a movement of the bounding box 17c. The image processing module may be configured to identify a lateral movement $\Delta Y$ which exceeds a predetermined threshold, for example within a set time period. The lateral movement $\Delta Y$ is illustrated in FIG. 7ciii by a first bounding box 17'c shown as a dashed line representing the position of the target vehicle 3c at a first time; and a second bounding box 17c shown as a continuous line representing the position of the target vehicle 3c at a second time. The threshold may be set by a calibration process or derived from observation of movement of the target vehicle 2c over a period of time. The thresholds may be adjusted dynamically, for example in dependence on an estimated speed of the target vehicle 3c.

The terrain inference system 1c may determine a geospatial position of the obstacle 20c. For example, the image processing module 10c may estimate a position of the obstacle 20c with reference to a known location of the host vehicle 2c. The image processing module 10c may be configured to track a wheel path of the target vehicle 3c. The wheel path could be used to estimate a location of the obstacle 20c that prompted a change in the trajectory of the target vehicle 3c.

The terrain inference system 1c described herein infers terrain characteristics in dependence on the movement or behaviour of another vehicle (the target vehicle 3), typically the vehicle in front of the host vehicle 2c. The terrain inference system 1c may thereby infer terrain characteristics which are obscured from on-board sensors by the target vehicle 3c. This has particular advantages if the distance between the host vehicle 2c and the target vehicle 3c is relatively small, for example when operating in traffic. The operation of a conventional scanning system, for example utilising a radar system, which directly scans the terrain may be impaired in this scenario.

The image processing module may be configured to detect and track the rear (tail) lights on a rear surface of the target vehicle 3c. This technique may be used instead of, or in addition to, the techniques described herein to identify an outline of the target vehicle 3c. This approach may be advantageous at night or in restricted visibility conditions. The host vehicle 2c could optionally emit light, for example from the headlamps, which is reflected off of the rear (tail) lights of the target vehicle 3c.

The terrain inference system 1c has been described with particular reference to sensing means 9c which is forward facing to enable detection and classification of the target vehicle 3c in front of the host vehicle 2c when it is travelling a forward direction. It will be understood that embodiments of the invention may be implemented in other configurations, for example comprising sensing means 9c which is side-facing and/or rear-facing. The image processing module 10c could optionally be configured to track movements of the wheels of the target vehicle 3c. Any such movements of the wheels of the target vehicle 3c may provide an indication of the operation of the suspension of the target vehicle 3c. The terrain inference system 1c may, for example, determine the surface roughness coefficient SRC in dependence on analysis of the behaviour of the vehicle suspension (not shown). For example, the extent and/or frequency of changes in the suspension height may be used to determine the surface roughness coefficient SRC.

The host vehicle 2c may be configured to transmit the determined terrain characteristics, for example to relay them to another vehicle (discrete from said host vehicle 2c and the target vehicle 3c).

Aspects and embodiments of the invention may be further understood with reference to the following non-limiting numbered clauses:

1a. A target object tracking system for a vehicle, the target object tracking system comprising:
  a processor for receiving image data captured by one or more sensor disposed on the vehicle, wherein the processor is configured to:
    analyse the image data to identify image components;
    determine a movement vector of each image component, the movement vectors each comprising a magnitude and a direction;
    classify at least one of the image components as a target image component relating to the target object and at least one of the remaining image components as a non-target image component;
    modify the movement vector of the at least one target image component in dependence on the movement vector of the or each non-target image component; and
    track the target object in dependence on the modified movement vector of the at least one target image component.

2a. A target object tracking system according to clause 1a, wherein the processor is configured to form at least a first set of said non-target image components, the first set comprising a plurality of said non-target image components identified as having movement vectors in a first direction.

3a. A target object tracking system according to clause 2, wherein the processor is configured to compare the magnitude of the movement vectors of the non-target image components, the non-target image components in the first set having substantially the same magnitude.

4a. A target object tracking system according to clause 2a or clause 3a, wherein the processor is configured to modify the movement vector of the at least one target image component by subtracting the movement vector of the non-target image components in said first set.

5a. A target object tracking system according to any one of clauses 1a to 4a, wherein the processor is configured to identify image components which are spatially separated from each other.

6a. A target object tracking system according to any one of the preceding clauses, wherein the image data is video image data captured by one or more image sensors disposed on the vehicle; and the processor is configured to acquire the or each image component as a persistent image component.

7a. A target object tracking system according to any one of the preceding clauses, wherein the target object is a moving target.

8a. A vehicle comprising a target object tracking system according to any one of the preceding clauses.

9a. A method of tracking a target object from a vehicle in dependence on image data captured by one or more sensor disposed on the vehicle; wherein the method comprises:
  analysing the image data to acquire image components;
  determining a movement vector of each image component, the movement vectors each comprising a magnitude and a direction;
  classifying at least one of the image components as a target image component relating to the target object and at least one of the remaining image components as a non-target image component;
  modifying the movement vector of the at least one target image component in dependence on the movement vector of the or each non-target image component; and
  tracking the target object in dependence on the modified movement vector of the at least one target image component.

10a. A method according to clause 9a comprising forming at least a first set of said non-target image components, the first set comprising a plurality of said non-target image components identified as having movement vectors in a first direction.

11a. A method according to clause 10a comprising comparing the magnitude of the movement vectors of the non-target image components, the non-target image components in the first set having substantially the same magnitude.

12a. A method according to clause 10a or clause 11a, wherein modifying the movement vector of the at least one target image component comprises subtracting the movement vector of the non-target image components in said first set.

13a. A method according to any one of clauses 9a to 12a comprising identifying image components in the image data which are spatially separated from each other.

14a. A method according to any one of clauses 9a to 13a, wherein the image data is video image data captured by one or more image sensors disposed on the vehicle; and the or each image component is a persistent image component.

15a. A method according to any one of clauses 9a to 14a, wherein the target object is a target vehicle.

16a. A non-transitory computer-readable medium having a set of instructions stored therein which, when executed, cause a processor to perform the method according to any one of clauses 9a to 15a.

17a. A target object acquisition system for a vehicle, the target object acquisition system comprising:
  a processor for receiving image data captured by one or more sensors disposed on the vehicle, wherein the processor is configured to:
    analyse the image data to identify image components;

determine a movement vector of each identified image component, the movement vectors each having a magnitude and a direction;

form a first set comprising a plurality of said image components having a first movement vector, and classifying the image components in said first set as non-target image components;

form a second set comprising an image component having a second movement vector, the second movement vector being different from the first movement vector, and classifying the or each image component in said second set as a target image component relating to the target object; and acquire the target object in dependence on the target image component in said second set.

18a. A target object acquisition system according to clause 17a, wherein said first set comprises a plurality of image components; and the second set consists of a single image component.

19a. A target object acquisition system according to clause 17a or clause 18a, wherein forming said first set comprises comparing the movement vectors of the image components and identifying at least one image component having a first movement vector comprising a first direction and/or a first magnitude.

20a. A target object acquisition system according to any one of clauses 17a, 18a or 19a, wherein forming said second set comprises comparing the movement vectors of the image components and identifying at least one image component having a second movement vector comprising a second direction and/or a second magnitude.

21a. A target object acquisition system according to clause 19a and clause 20a, wherein the first direction and the second direction are different from each other; and/or the first magnitude and the second magnitude are different from each other.

22a. A target object acquisition system according to any one of clauses 17a to 21a, wherein the image components identified in the image data are spatially separated from each other.

23a. A target object acquisition system according to any one of clauses 17a to 22a wherein the image data is video image data captured by one or more image sensors disposed on the vehicle; and the or each image component is a persistent image component.

24a. A vehicle comprising a target object acquisition system according to any one of the clauses 17a to 23a.

25a. A method of acquiring a target object from a vehicle in dependence on image data captured by one or more sensor disposed on the vehicle; wherein the method comprises:
analysing the image data to acquire image components;
determining a movement vector of each identified image component, the movement vectors each having a magnitude and a direction;
forming a first set comprising a plurality of said image components having a first movement vector, and classifying the image components in said first set as non-target image components;
forming a second set comprising an image component having a second movement vector, the second movement vector being different from the first movement vector, and classifying the or each image component in said second set as a target image component relating to the target object; and
acquire the target object in dependence on the target image component in said second set.

26a. A method system according to clause 25a, wherein said first set comprises a plurality of image components; and the second set consists of a single image component.

27a. A method system according to clause 25a or clause 26a, wherein forming said first set comprises comparing the movement vectors of the image components and identifying at least one image component having a first movement vector comprising a first direction and/or a first magnitude.

28a. A method according to any one of clauses 25a, 26a or 27a, wherein forming said second set comprises comparing the movement vectors of the image components and identifying at least one image component having a second movement vector comprising a second direction and/or a second magnitude.

29a. A method according to clause 27a and clause 28a, wherein the first direction and the second direction are different from each other; and/or the first magnitude and the second magnitude are different from each other.

30a. A method according to any one of clauses 25a to 29a, wherein the image components identified in the image data are spatially separated from each other.

31a. A method according to any one of clauses 25a to 30a, wherein the image data is video image data captured by one or more image sensors disposed on the vehicle; and the or each image component is a persistent image component.

32a. A non-transitory computer-readable medium having a set of instructions stored therein which, when executed, cause a processor to perform the method according to any one of clauses 25a to 31a.

1b. An object classification system for a vehicle, the object classification system comprising a controller configured to:
receive sensor data from at least one sensor; and
process the sensor data to classify one or more object external to the vehicle;
wherein the processing of the sensor data is controlled in dependence on a surface roughness coefficient, the surface roughness coefficient being indicative of a roughness of a surface on which the vehicle is travelling.

2b. An object classification system according to clause 1b, wherein processing the sensor data comprises applying an object classification algorithm to the sensor data.

3b. An object classification system according to clause 2b, wherein the object classification algorithm applies a dynamic classification filter.

4b. An object classification system according to clause 3b, wherein the dynamic classification filter is modified in dependence on said surface roughness coefficient.

5b. An object classification system according to clause 3b or clause 4b, wherein the dynamic classification filter is modified in dependence on a vehicle speed.

6b. An object classification system according to any one of the preceding clauses, wherein the controller is configured to receive said surface roughness coefficient.

7b. An object classification system according to any one of clauses 1b to 5b, wherein the controller is configured to determine said surface roughness coefficient.

8b. An object classification system according to any one of the preceding clauses, wherein the sensor data comprises image data received from at least one image sensor; and the processing of the sensor data comprises image processing.

9b. A vehicle comprising an object classification system according to any one of the preceding clauses.

10b. A method of classifying objects external to a vehicle, the method comprising:

determining a roughness of a surface on which the vehicle is travelling;

receiving sensor data from at least one sensor provided on the vehicle; and analysing the sensor data to classify one or more object; wherein the analysis of the sensor data is modified in dependence on the determined surface roughness.

11b. A method according to clause 10b comprising applying an object classification algorithm to the sensor data.

12b. A method according to clause 11b, wherein the object classification algorithm applies at least one classification filter.

13b. A method according to clause 12b, wherein the object classification algorithm applies a dynamic classification filter.

14b. A method according to clause 13b wherein the dynamic classification filter is modified in dependence on said surface roughness coefficient.

15b. A method according to clause 13b or clause 14b, wherein the dynamic classification filter is modified in dependence on a vehicle speed.

16b. A method according to any one of clauses 9b to 15b comprising receiving the surface roughness coefficient.

17b. A method according to any one of clauses 10b to 15b comprising determining said surface roughness coefficient.

18b. A method according to any one of clauses 10b to 17b, wherein the method comprises processing image data received from at least one image sensor.

19b. A non-transitory computer-readable medium having a set of instructions stored therein which, when executed, cause a processor to perform the method according to any one of clauses 10b to 18b.

1c. A terrain inference system terrain inference system comprising a controller configured to:

monitor a target vehicle;

identify an attitude of the target vehicle and/or a movement of the target vehicle; and infer at least one terrain characteristic relating to a region of terrain proximal to the target vehicle in dependence on the identified attitude of the target vehicle and/or the identified movement of the target vehicle.

2c. A terrain inference system according to clause 1c, wherein the inferred terrain characteristic comprises at least one of the following set: an incline angle, an incline direction, a surface roughness, and a terrain composition.

3c. A terrain inference system according to clause 1c or clause 2c, wherein the controller is configured to generate a vehicle control parameter in dependence on the at least one inferred terrain characteristic.

4c. A terrain inference system according to clause 3c, wherein the vehicle control parameter comprises at least one of the following set: a drivetrain control parameter, a transmission control parameter, a chassis control parameter, and a steering control parameter.

5c. A terrain inference system according to any one of clauses 1c to 4c, wherein the controller is configured to output an alert in dependence on the inferred terrain characteristic.

6c. A terrain inference system according to any one clauses 1c to 5c, wherein identifying the attitude of said target vehicle comprises identifying at least one of the following set: a target vehicle pitch angle, a target vehicle roll angle, and a target vehicle yaw angle.

7c. A terrain inference system according to clause 6c, wherein identifying the movement of said target vehicle comprises identifying at least one of the following set: a change in the target vehicle pitch angle, a change in the target vehicle roll angle, and a change in the target vehicle yaw angle.

8c. A terrain inference system according to any one of clauses 1c to 7c, wherein identifying the movement of said target vehicle comprises identifying at least one of the following set: a vertical movement, a transverse movement, and a longitudinal movement.

9c. A terrain inference system according to any one of clauses 1c to 8c, wherein identifying the movement of said target vehicle comprises identifying an extension or a compression of a vehicle suspension.

10c. A terrain inference system according to any one of clauses 1c to 9c, wherein the controller is configured to receive image data from at least one image sensor, the controller being configured to process said image data to identify the attitude of the target vehicle and/or the movement of the target vehicle.

11c. A terrain inference system according to any one of clauses 1c to 10c, wherein the controller is configured to determine a geographic position of a target vehicle and to map said at least one terrain characteristic in dependence on the determined geographic position.

12c. A vehicle comprising a terrain inference system according to any one of clauses 1c to 11c.

13c. A method of inferring at least one characteristic of the terrain proximal to a target vehicle, the method comprising:

monitoring a target vehicle;

identifying an attitude of the target vehicle and/or a movement of the target vehicle; and inferring said at least one terrain characteristic proximal to the target vehicle in dependence on the identified attitude and/or the identified movement.

14c. A method according to clause 13c, wherein the inferred terrain characteristic comprises at least one of the following set: an incline angle, an incline direction, a surface roughness, and a terrain composition.

15c. A method according to clause 13c or clause 14c comprising generating a vehicle control parameter in dependence on the at least one inferred terrain characteristic.

16c. A method according to clause 15c, wherein the vehicle control parameter comprises at least one of the following set: drivetrain control parameter, a transmission control parameter, a chassis control parameter, and a steering control parameter.

17c. A method according to any one of clauses 13c to 16c comprising outputting an alert in dependence on the inferred terrain characteristic.

18c. A method according to any one of clauses 13c to 17c, wherein identifying the attitude of said target vehicle comprises identifying at least one of the following set: a target vehicle pitch angle, a target vehicle roll angle, and a target vehicle yaw angle.

19c. A method according to clause 18c, wherein identifying the movement of said target vehicle comprises identifying at least one of the following set: a change in the target vehicle pitch angle, a change in the target vehicle roll angle, and a change in the target vehicle yaw angle.

20c. A method according to any one of clauses 13c to 19c, wherein identifying the movement of said target vehicle comprises identifying at least one of the following set: a vertical movement, a transverse movement, and a longitudinal movement.

21c. A method according to any one of clauses 13c to 20c, wherein identifying the movement of said target vehicle comprises identifying an extension or a compression of a vehicle suspension.

22c. A method according to any one of clauses 13c to 21c comprising receiving image data from at least one image sensor, the method comprising processing said image data to identify the attitude of the target vehicle and/or the movement of the target vehicle 23c. A method according to any one of clauses 13c to 22c comprising determining a geographic position of a target vehicle and to map said at least one terrain characteristic in dependence on the determined geographic position.

24c. A non-transitory computer-readable medium having a set of instructions stored therein which, when executed, cause a processor to perform the method according to any one of clauses 13c to 23c.

It will be understood by those skilled in the art that various modifications may be made to the embodiments described above, which are provided by way of example only, without departing from the scope of the following claims.

The invention claimed is:

1. A controller for a vehicle having at least one sensor, the controller including a processor and being configured to:
   receive sensor data from at least one sensor of the vehicle; and
   process the sensor data to classify one or more moving targets external to the vehicle in dependence on a surface roughness coefficient, wherein the one or more moving targets includes a pedestrian, cyclist, or vehicle, wherein classification of the one or more moving targets as a pedestrian, cyclist, or vehicle is performed based on the surface roughness coefficient, and wherein the surface roughness coefficient is indicative of a roughness of a surface on which the vehicle is travelling.

2. A controller as claimed in claim 1, wherein the processor is configured to apply an object classification algorithm to the sensor data.

3. A controller as claimed in claim 2, wherein the object classification algorithm applies a dynamic classification filter.

4. A controller as claimed in claim 2, wherein the dynamic classification filter is modified in dependence on said surface roughness coefficient and/or on a speed of the vehicle.

5. A controller as claimed in claim 1, wherein the controller is configured to receive said surface roughness coefficient or to determine said surface roughness coefficient.

6. A controller as claimed in claim 1, wherein the sensor data comprises image data received from at least one image sensor; and the processing of the sensor data comprises image processing.

7. A vehicle having a controller as claimed in claim 1.

8. A method of classifying moving targets external to a vehicle, the method comprising:
   determining a roughness of a surface on which the vehicle is travelling;
   receiving sensor data from at least one sensor provided on the vehicle; and
   analysing the sensor data to classify one or more objects, wherein the one or more objects includes a pedestrian, cyclist, or vehicle;
   wherein the analysis of the sensor data is modified in dependence on the determined surface roughness, and wherein classification of the one or more objects as a pedestrian, cyclist, or vehicle is performed based on the determined surface roughness.

9. A non-transitory computer-readable medium having a set of instructions stored therein which, when executed, cause a processor to perform the method claimed in claim 8.

* * * * *